(12) United States Patent
Refstrup et al.

(10) Patent No.: US 9,208,589 B2
(45) Date of Patent: Dec. 8, 2015

(54) OPTICAL KERNING FOR MULTI-CHARACTER SETS

(71) Applicant: Apple Inc., Cupertino, CA (US)

(72) Inventors: Jacob G. Refstrup, Vancouver, WA (US); Martin J. Murrett, Portland, OR (US); Christopher E. Rudolph, Vancouver, WA (US)

(73) Assignee: APPLE INC., Cupertino, CA (US)

( * ) Notice: Subject to any disclaimer, the term of this patent is extended or adjusted under 35 U.S.C. 154(b) by 134 days.

(21) Appl. No.: 13/657,822

(22) Filed: Oct. 22, 2012

(65) Prior Publication Data
US 2014/0111522 A1   Apr. 24, 2014

(51) Int. Cl.
*G06K 9/46* (2006.01)
*G06T 11/20* (2006.01)
*G09G 5/24* (2006.01)

(52) U.S. Cl.
CPC .......... *G06T 11/203* (2013.01); *G06K 2215/00* (2013.01); *G06K 2215/0068* (2013.01); *G09G 5/24* (2013.01)

(58) Field of Classification Search
USPC .......................................................... 345/468
See application file for complete search history.

(56) References Cited

U.S. PATENT DOCUMENTS

| 5,432,890 | A  | * | 7/1995  | Watanabe ..................... 715/210 |
| 5,803,629 | A  | * | 9/1998  | Neville et al. ................. 400/304 |
| 6,624,814 | B1 | * | 9/2003  | Karow et al. .................. 345/467 |
| 7,492,366 | B2 | * | 2/2009  | Burago et al. ............. 345/469.1 |
| 2005/0177786 | A1 | * | 8/2005  | Shade et al. .................. 715/518 |
| 2007/0242071 | A1 | * | 10/2007 | Harding ..................... 345/469.1 |
| 2008/0238927 | A1 | * | 10/2008 | Mansfield ..................... 345/467 |
| 2010/0107062 | A1 | * | 4/2010  | Bacus et al. .................. 715/269 |
| 2011/0119272 | A1 | * | 5/2011  | Mansfield et al. ............ 707/739 |

* cited by examiner

*Primary Examiner* — Stephen R Koziol
*Assistant Examiner* — Terrell Robinson
(74) *Attorney, Agent, or Firm* — Adeli LLP

(57) ABSTRACT

A content processing application that implements a method for displaying characters at least a threshold distance apart. The method receives two consecutive characters. The method automatically identifies a distance between the two consecutive characters and moves at least one of the two consecutive characters to adjust the distance between the two consecutive characters to a threshold distance apart.

20 Claims, 15 Drawing Sheets

OPTICAL KERNING FOR MULTI-CHARACTER SETS

BACKGROUND

Adjacent characters generated by content processing applications are displayed with particular distances between them. For a given character font, there are default distances to the left and right associated with each character. Together, the default distances of adjacent characters determine an initial value for how far apart the characters will be when they are displayed. Separate from the default individual distances, there are additional distances associated with some font sets in some content processing applications. These additional distances determine how far particular pairs of adjacent characters will deviate from their default distances. These additional distances can be positive or negative and are used to produce better results than default distances alone.

The application of such distance adjustments is called "kerning". Many programs (e.g., content processing applications, word processors, equation editors, etc) use "kerning tables" that associate pairs of adjacent letters with a distance adjustment. For example, some programs use a kerning table that brings letters such as capital "W" and capital "A" closer together than the default values. The default values of some characters keep the characters from overlapping when they are displayed adjacent to each other, but do not account for the fact that the right side of the capital "W" is high, while the left side of the capital "A" is low, meaning that the letters "WA" can be moved closer together without overlapping.

Kerning tables in previous programs were manually generated, with a font designer determining which pairs of adjacent characters should be moved closer or farther than their default distances would indicate. Because of limitations on font designer time and storage space, Kerning tables used by some content processing applications are only provided within a particular font and style (e.g., Times New Roman, plain) and are not provided for adjacent characters when one is a subscript and the other is not, adjacent characters when one is a superscript and the other is not, adjacent characters in two different fonts, adjacent characters in two different font sizes, or adjacent characters in two different styles (e.g., one bold, one italic).

The size of kerning tables increases as the square of the number of characters in the kerning table. Every character, in every font, in every style, and in every relative size would be an additional character for a "complete" kerning table. As an example of the rapid increase in the number of characters, an italic lower case "f" to the left of a non-italic (plain) close quotation mark would require a separate entry in a kerning table from a non-italic (plain) lower case "f" to the left of a non-italic (plain) close quotation mark. Another entry would be required for a bold "f" to the left of a non-italic (plain) close quotation mark. Still another entry would be required for a bold, italicized "f" to the left of a non-italic (plain) close quotation mark. More entries would be required for subscripts and superscripts of the various styles of lower case "f" to the left of a non-italic (plain) close quotation mark. Still more entries would be required for bold, italic, and bold-italic close quotation marks, etc. Merely increasing the number of possible fonts from 1 to 10 would raise the number of possible character pairs by a factor of 100. Accordingly, manually generating "complete" kerning tables is not practical for content processing applications.

BRIEF SUMMARY

Some embodiments provide a method for a content processing application (e.g., a word processor, equation editor, mathematics program, document authoring application, etc.) to automatically move adjacent characters apart or together. In some embodiments the characters are moved apart or together without a previously defined kerning table entry associated with the characters. The characters can be in different fonts, different styles, or different font sizes. The characters can be along different baselines, such as subscripts or superscripts. In some embodiments, the content processing application moves the characters to a threshold distance apart if the characters were not already at least the threshold distance apart. The threshold distances of some embodiments depend on at least one of font, size and style.

The content processing application of some embodiments performs a method of determining distances between characters. The method determines a quantization distance for each of a plurality of characters. For each character, the method identifies multiple horizontal coordinates that each approximate a section of an edge of the character. The distance between consecutive sections of the edge being the quantization distance. For each character, the method stores data identifying the sections (e.g., the horizontal data and the quantization distance). The content processing application of some embodiments uses the stored data to determine an approximate distance between the edges of two adjacent characters.

The content processing application of some embodiments adjusts the stored data with character font size (e.g., data values calculated for a 12 point version of a character are doubled for a 24 point version of that character with the same font, style, etc.). In some embodiments, the content processing application performs separate analysis of characters with different font styles.

In some embodiments, the content processing application uses a method that determines a distance between two adjacent characters. The method of determining a distance between the characters includes approximating an edge of a first character as a first sequential set of sections. The content processing application also approximates an edge of a second character as a second sequential set of sections. The content processing application iteratively selects pairs of sections, each pair comprising a section from the first series of sections and a section from the second series of sections. In each iteration, a section that is farther in the first series than in the previous iteration is selected or a section that is farther in the second series than in the previous iteration is selected. The content processing application determines a distance between each of the plurality of pairs of selected sections. The content processing application identifies a smallest distance between the pairs of sections as the distance between the adjacent characters.

In the content processing applications of some embodiments, for multiple consecutive iterations, the selected sections alternate between the first series and the second series. In some embodiments, for multiple consecutive iterations, the selected section in the first series is one section farther along in the first series than the selected section of the first series in the previous iteration. The content processing application of some embodiments, in a particular iteration, selects a section in the first series that is more than one section farther along in the first series than the selected section of the first series in the previous iteration. The content processing application of some embodiments, in at least one iteration, selects a section in the first series that is aligned with the selected section of the second series.

The preceding Summary is intended to serve as a brief introduction to some embodiments described herein. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

The content processing application of some embodiments identifies a distance between adjacent characters, determines whether the characters are at least a threshold distance apart and then moves one or more characters to locations that are at least a threshold distance apart.

Some embodiments provide a method for a content processing application (e.g., a word processor, equation editor, mathematics program, document authoring application, etc.) to automatically move adjacent characters apart or together.

In some embodiments the characters are moved apart or together without a previously defined kerning table entry associated with the characters. The characters can be in different fonts, different styles, or different font sizes. The characters can be along different baselines (i.e., characters are aligned along two different horizontal levels), such as subscripts, superscripts, or other characters displayed on different levels such as a whole number in advance of a number of the top or bottom of a division operation. In some embodiments, the content processing application moves the characters to a threshold distance apart if the characters were not already at least the threshold distance apart. The threshold distances of some embodiments depend on at least one of font, size and style.

Figure 1:
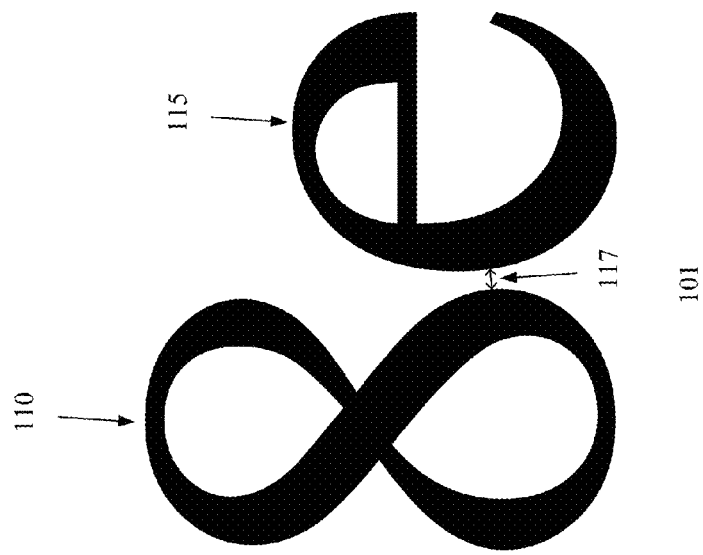
FIG. 1 illustrates the movement of one of two characters to a threshold distance apart from the other character.
Figure 1:
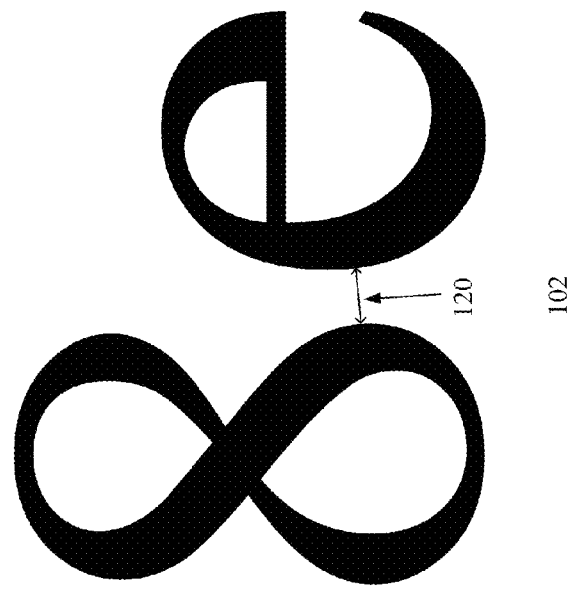

FIG. 1 illustrates the movement of one of two characters to a threshold distance apart from the other character. The figure shows characters 110 and 115, original distance 117 and threshold distance 120 in two stages, 101 and 102. Character 110 is the number "8" on the left side of character 115, a lower case "e". In stage 101, the closest parts of characters 110 and 115 are a distance 117 apart. The distance 117 is less than the threshold distance 120. A content processing application (not shown) of some embodiments moves the characters farther apart, to the threshold distance 120.

In some embodiments, the characters are encoded as glyphs. Glyphs are sets of vectors and curves or sets of points with defined curvature connecting the points. In other embodiments the characters are defined by other encoding systems. Determining the distance between curves is a computation intensive task. In order to reduce the computation time used to determine distances between characters, the content processing application of some embodiments performs a method of approximating distances between characters. The method determines a quantization distance for the adjacent edges of at least two characters. For each character, the method identifies multiple sections bounded by horizontal coordinates that each approximates a location of an edge of the character. The distance between consecutive sections of the edge is the quantization distance. For each character, the method stores data identifying the sections (e.g., the horizontal data and the quantization distance). The content processing application of some embodiments uses the stored data to determine an approximate distance between the edges of two adjacent characters.

The content processing application of some embodiments adjusts the stored data with character font size (e.g., data values calculated for a 12 point version of a character are doubled for a 24 point version of that character with the same font, style, etc.). In some embodiments, the content processing application performs separate analysis of characters with different font sizes. Similarly, in some embodiments, the content processing application performs separate analysis of characters with different font styles.

The content processing application of some embodiments, after approximating the edges of a pair of characters as sets of sections iteratively selects pairs of sections, each pair comprising a section from each of the two characters. In each iteration, a section is selected that is farther along one of the edges than the section selected in the previous iteration. The content processing application determines a distance between each of the plurality of pairs of selected sections. The content processing application identifies a smallest distance between the pairs of sections as the distance between the adjacent characters.

In the content processing applications of some embodiments, for multiple consecutive iterations, the selected sections alternate between the first series and the second series.

In some embodiments, for multiple consecutive iterations, the selected section in the first series is one section farther along in the first series than the selected section of the first series in the previous iteration. The content processing application of some embodiments, in a particular iteration, selects a section in the first series that is more than one section farther along in the first series than the selected section of the first series in the previous iteration. The content processing application of some embodiments, in at least one iteration, selects a section in the first series that is aligned with the selected section of the second series.

As mentioned, in some embodiments, the character kerning is performed by a content processing application. The content processing application of some embodiments performs the kerning of the characters as the user enters the characters and as the characters are generated for display. For instance, in a word processor or the equation editor of such an application, the characters may be kerned as the user enters characters into a document processed by the application. On the other hand, some embodiments perform the character kerning process when generating a document for publication (e.g., when generating a formatted electronic book or when formatting a document generated in a markup language).

The following description of some embodiments is broken down into five sections. Section I describes modifying the inter-character distances. Then Section II describes how the edges of adjacent characters are quantized to simplify determining the approximate distance between them. Section III then describes identifying the distances between characters. Section IV then describes a document authoring application of some embodiments. Finally, Section V describes a computer system that executes the content processing application of some embodiments.

I. Modifying Inter-character Distances

When the default distances of a pair of characters place the characters closer together than a threshold value, a content processing application of some embodiments moves the characters farther apart. The content processing application of some embodiments also moves subsequent characters over after moving an initial character.

Figure 2:
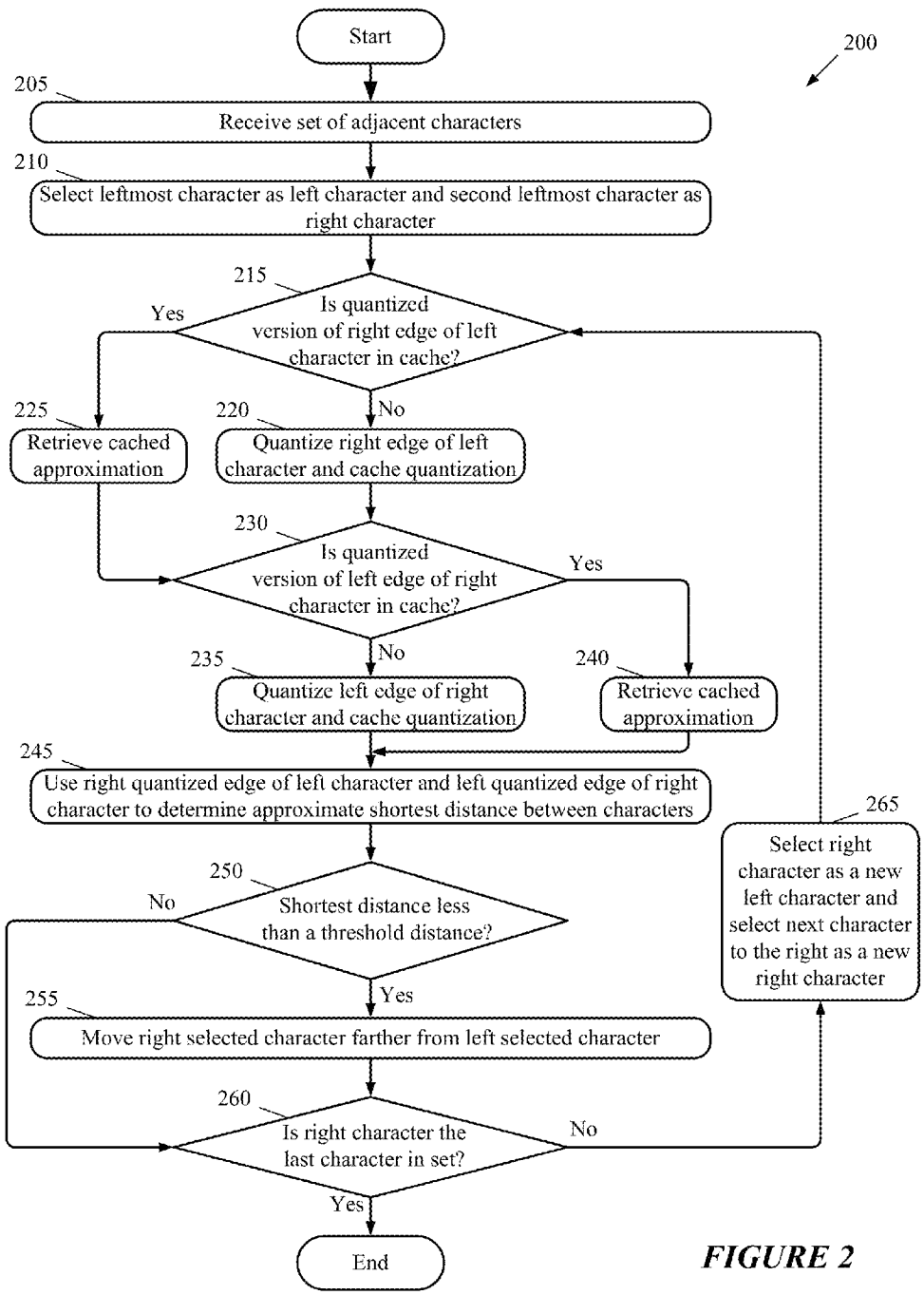
FIG. 2 conceptually illustrates a process for setting characters to at least a threshold distance apart.

In some embodiments, the content processing application uses a process that determines the distance between characters and moves the characters that are less than a threshold distance apart along with any subsequent characters. FIG. 2 conceptually illustrates a process 200 for setting characters to at least a threshold distance apart. The process 200 begins by receiving (at 205) a set of adjacent characters. The set of adjacent characters can be a mathematical operation, text, or some other set of adjacent characters.

Once the set of characters has been received, the process 200 selects (at 210) the leftmost character of the set of characters as a left character of a pair of characters and selects the second leftmost character of the pair of characters as the right character of the set of characters. The process 200 evaluates the character spacing one pair of adjacent characters at a time. The selected characters are the first two characters of the set to be evaluated.

After selecting the pair of characters, the process determines (at 215) whether there is a quantized version of the right edge of the left character in a cache that stores data approximating the right edges of characters. If the cache does not contain the quantized right edge, then the process 200 quantizes (at 220) the right edge of the left character, adds the quantization to the cache, and proceeds to operation 230. In some embodiments, cached edge data may be from different font sizes than the current font of the character. For example, if the same character has previously been quantized in 12 point font, the stored values will be doubled for the same character being evaluated in 24 point font. Quantization and caching are described with respect to FIG. 4, in Section II, below. If the process 200 determines (at 215) that the cache does contain a quantized approximation of the right edge of the character, then the process retrieves (at 225) the quantized approximation from the cache and proceeds to operation 230.

After retrieving or calculating a quantized approximation of the right edge of the left character, the process 200 determines (at 230) whether there is a quantized version of the left edge of the right character in a cache that stores data approximating the left edges of characters. In some embodiments, there is a common cache that stores quantized data about both the left and right edges of characters. If the cache does not contain the quantized left edge, then the process 200 quantizes (at 235) the left edge of the right character, adds the quantization to the cache, and proceeds to operation 245. If the process 200 determines (at 230) that the cache does contain a quantized approximation of the left edge of the character, then the process retrieves (at 240) the quantized approximation from the cache and proceeds to operation 245.

After retrieving or calculating a quantized approximation of the left edge of the right character, the process 200 uses (at 245) the quantized left and right edges to determine the shortest distance between the two selected characters. A process of some embodiments for identifying the shortest distance between two adjacent characters is described in Section III with respect to FIGS. 6 and 7.

After determining the shortest distance between the two selected characters, the process 200 determines (at 250) whether the shortest distance is less than a threshold distance. The threshold distance is the shortest acceptable distance between the characters. The threshold distance in some embodiments depends on the font size of one or both of the characters, the style (e.g., bold, normal, or italic), and/or the placement of the characters (e.g., subscript, normal, or superscript). If the shortest distance between the characters is less than the threshold distance, then the process 200 moves (at 255) the right character and the subsequent characters in the set farther to the right. The process 200 then proceeds to operation 260. If the process 200 determines (at 250) that the shortest distance between the characters is larger than the threshold distance, then the process 200 proceeds directly to operation 260.

After ensuring that the right character is at least the threshold distance to the right of the left character, the process 200 of some embodiments determines (at 260) whether the right character of the selected pair of characters is the rightmost character of the set of adjacent characters. If the right character of the selected pair of characters is the rightmost character of the set of adjacent characters, then the process 200 ends. If the right character of the selected pair of characters is not the rightmost character of the set of adjacent characters, then the process 200 proceeds to operation 265. The process 200 then selects (at 265) the right character of the selected pair of characters as the left character in a new pair of adjacent characters. The process 200 then selects (at 265) the next character to the right of the right character of the selected pair of characters as the right character in the new pair of adjacent characters.

After selecting the new pair of characters, the process 200 then returns to operation 215 to begin analyzing the new pair of characters. The process 200 continues until the last pair of characters has been analyzed.

Figure 3:
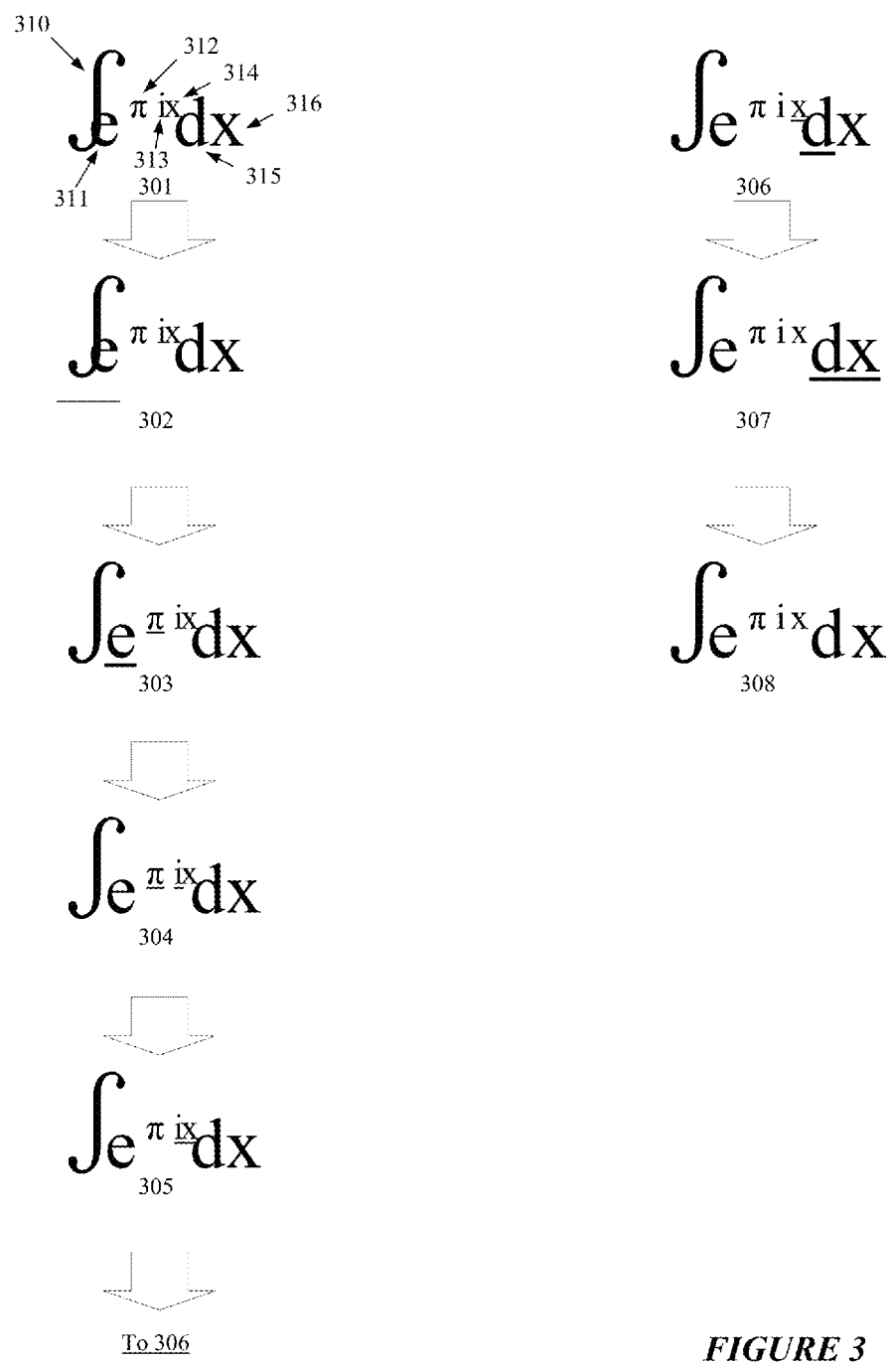
FIG. 3 illustrates the movement of characters in a set of adjacent characters as each pair of characters is individually kerned.

As described above, when the process 200 moves the right character, other characters farther to the right in the set also move by a corresponding amount. FIG. 3 illustrates the movement of characters in a set of adjacent characters as each pair of characters is individually kerned. FIG. 3 includes characters 310-316 in stages 301-308. Characters 310-316 are a set of characters that make up a mathematical operation (an integration operation). These characters might be displayed within an equation editor of a word processing application or a document publishing application of some embodiments. In this case, the stages of FIG. 3 represent the processing stages performed by the application before actually displaying the set of characters. In other embodiments, these stages represent the processing performed to format the characters (e.g., when converting a document to a PDF or an electronic book). Stages 301-308 illustrate various stages in adjusting character distances.

The characters 310-316 are originally arranged at a set of initial locations that result in some of the characters 310-316 being too close to the adjacent characters. Some of the characters 310-316 overlap with adjacent characters. In contrast, some of the characters 310-316 are already above a threshold distance from one or both of their adjacent characters in stage 301.

In stage 301, the characters 310-316 are received at their default positions. In stage 302, the first two characters, the integral symbol 310 and the character "e" 311 are selected, as indicated by the underlining of the pair of characters. In stage 303, the character "e" 311 has been moved to the right to be the threshold distance away from the integral symbol 310 as described with respect to process 200 of FIG. 2. The characters 312-316 have also been moved to the right in order to maintain the default distances between each character. Also in stage 303, the character "e" 311 has been selected as the new left character and the character pi 312 has been selected as the new right character. Characters "e" 311 and pi 312 were initially separated by at least the threshold distance, so neither the character pi 312 nor the characters 313-316 are moved further to the right between stage 303 and stage 304.

In stage 304, the characters pi 312 and "i" 313 are selected. These characters 312-313 are also at least the threshold distance apart. Therefore the characters 313-316 are not moved between stages 304 and 305. In stage 305, characters i 313 and x 314 are selected. Characters 313-314 are closer together than the threshold distance in stage 305 and therefore characters 314-316 are moved to the right between stage 305 and stage 306. Similarly, characters 314 and 315 are too close together in stage 306 and characters 315 and 316 are too close together in stage 307. Accordingly, the characters 315-316 are moved to the right between stages 306 and 307 and character 316 is moved farther to the right between stages 307 and 308. After the last character to the right is evaluated, the entire set of characters 310-316 is each at least the threshold distance apart from each adjacent character in stages.

In the above described embodiments, each character was evaluated as a left character in relation to its right character at most once and as a right character in relation to its left character at most once. However, in some embodiments, some characters may be evaluated as left characters multiple times or as right characters multiple times under some circumstances. For example, if a character has both a subscript character and a superscript character directly to the right of the character (e.g., x sub 2 squared), then the left character would be evaluated separately with relation to each of the subscript and superscript characters, and the subscript character and superscript character would each be moved to the right (or not moved at all) by a distance dependent on their individual distances from the left character. Similarly, a character to the right of both a subscript and a superscript character (e.g., a character to the right of x sub 2 prime), would be moved to the right (or not moved) based on the larger of the distances necessary to keep the right character a threshold distance from each of the subscript and superscript characters.

II. Quantizing Edges of Characters

As described above, the determination of the distance between two characters includes the quantization of the edges of the characters. The quantization of the edges simplifies the task of determining the distance between the often complicated edges of characters. In some embodiments, multiple characters and both edges of each character are selected for quantization before the characters are used. In such embodiments the content processing application performs the analysis and caches the results in order to use quantization values when the characters are actually used as part of a set of adjacent characters. In other embodiments the edges of characters are quantized as the content processing application deploys the characters as parts of the multi-character sets described with respect to FIG. 2. In some such embodiments the content processing application then caches the results of the quantization for later recall if the same edges are used later in the same set of characters or a different set of characters.

In some embodiments, the content processing application retrieves any previously calculated edge approximations from a cache and calculates any required new edge approximations. The edge approximations identify horizontal coordinates of a plurality of vertical sections of the character. In some embodiments, each section represents a rectangle with an edge at the given horizontal coordinate and a top and bottom at the vertical start and end of a quantized level of the character.

Figure 4:
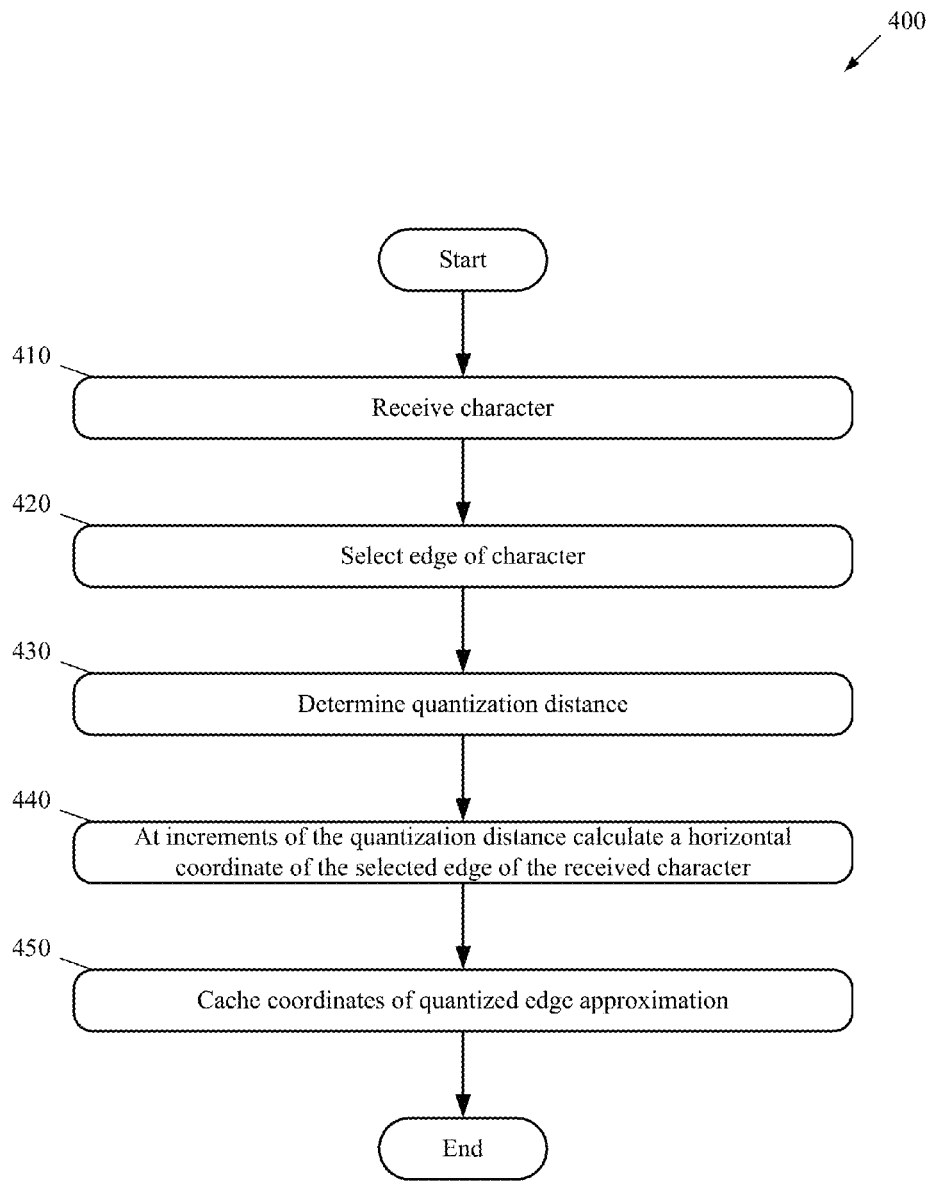
FIG. 4 conceptually illustrates a process of some embodiments for quantizing the edge of a character.
Figure 5:
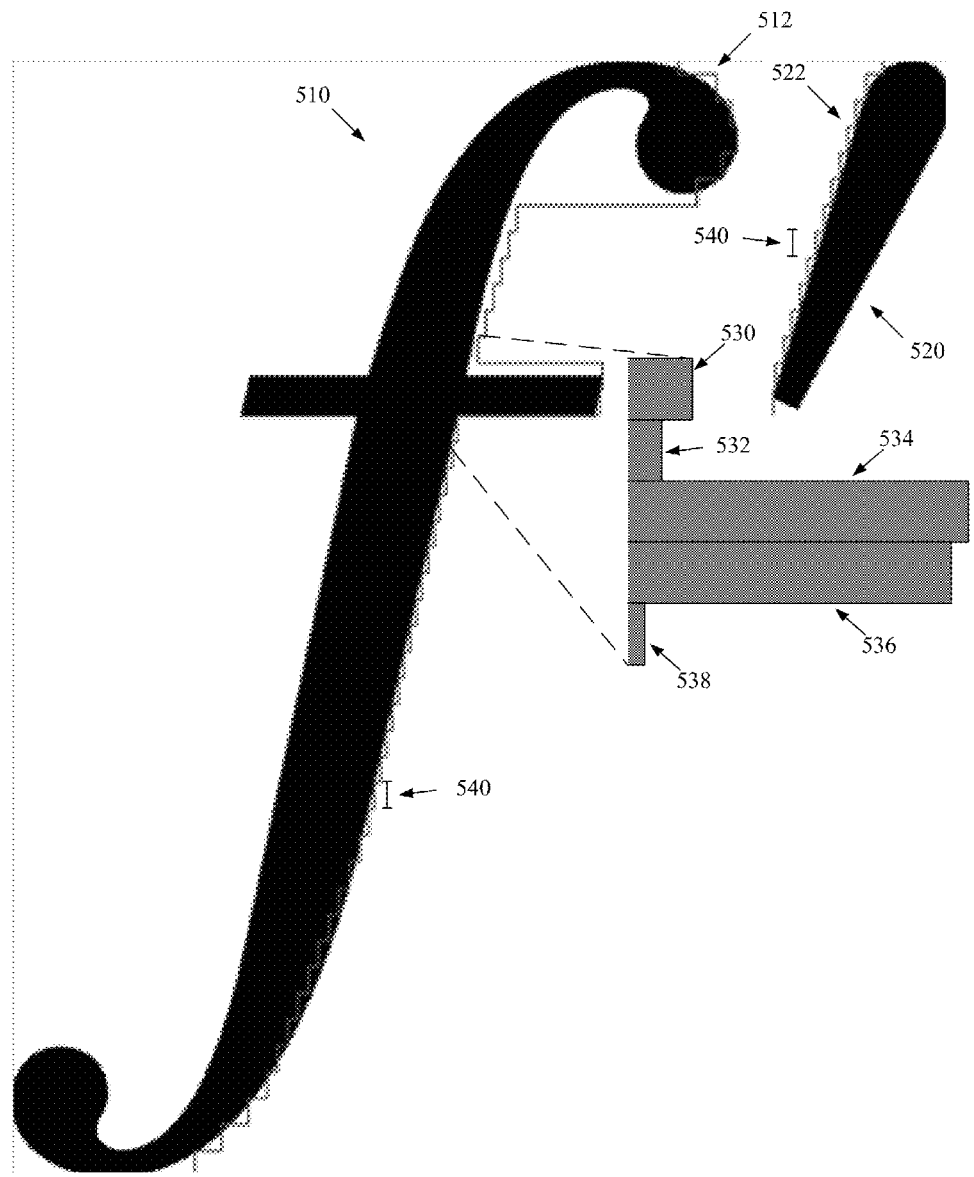
FIG. 5 illustrates two quantized characters with their quantized sections.

FIG. 4 conceptually illustrates a process 400 of some embodiments for quantizing the edge of a character. Some operations of the process 400 will be described with respect to FIG. 5. FIG. 5 illustrates two quantized characters. FIG. 5 includes characters 510 and 520, edges 512 and 522, and quantized sections 530-538.

The process 400 begins by receiving (at 410) a character. For example, in FIG. 5 there are two received characters, specifically a lower case italic "f" 510 and an italic single quote 520. The process then selects (at 420) an edge of the character. In some embodiments, the process determines which edge to select based on which side of the character is adjacent to another character. In FIG. 5, the right edge 512 of character 510 has been selected and the left edge 522 of character 520 has been selected.

In FIG. 5, the right sides of quantized sections 530-538 are positioned based on the rightmost point within that quantized level. For sections 530, 534, 536, and 538, the content processing application has identified the farthest right point of each quantized level. At the quantized levels of the sections 530, 532, and 538, the farthest right point of the italic "f" is on the vertical stroke of the character. At the quantized levels of section 534 and 536, the farthest right point of the italic "f" is the right end of the crossbar of the character. The horizontal coordinate in some embodiments is determined by the rightmost point within the entire quantized level rather than the rightmost point at some particular part of the quantized level (e.g., the top or bottom of the quantized level). Accordingly, even though some points on the quantized level represented by section 534 are on the vertical stroke of the character (e.g., the points at the top of the quantized level), the presence of those points does not affect the horizontal coordinate of the section 534. Similarly, for the right edge 522 of character 520, the leftmost horizontal coordinate within a given quantized level determines the quantized horizontal coordinate.

After selecting the edge of the character, the process 400 then determines (at 430) a quantization distance for the edge (e.g., quantized distance 540 of FIG. 5). In some embodiments, the quantization distance is much less than the height of the character. In FIG. 5, the edge 512 of italic "f" character 510 has been divided into 43 sections, based on a quantization distance. Similarly, the edge 522 of the italic single quote 520 has been divided into 14 sections, based on the same quantization distance.

The quantization distance of some embodiments is a fraction of the total available height for a character in the given font (e.g., $\frac{1}{50}^{th}$ of the maximum height available in a 12 point font). In other embodiments, the quantization distance is a fixed height (e.g., ¼ of a font point). In still other embodiments, the distance is a fraction of the total height of the selected character or of some particular character in the font.

After determining the quantization distance, the process 400 then calculates (at 440) a horizontal coordinate of the selected edge of the character at multiples of the quantization distance. In some embodiments, the horizontal coordinate is calculated for a given quantized level based on the farthest point of the edge at that quantization level. For example, for a right edge of a left character, the rightmost point of the character between the top and bottom of a quantized level determines the horizontal coordinate of that quantized level. Similarly, for a left edge of a right character, the leftmost point of the edge between the top and bottom of a quantized level determines the horizontal coordinate of that quantized level.

After calculating the quantized horizontal coordinates, the process 400 of some embodiments caches (at 450) the horizontal coordinates. In some embodiments, the content processing application caches the quantization distance as well as the horizontal coordinates. However, in other embodiments, the content processing application caches data that allows the content processing application to later determine the quantization distance, such as whatever data was used to calculate the original quantization distance (e.g., the height of the character, the number of levels of the character, etc). In still other embodiments, the content processing application determines the quantization distance based on the number of horizontal coordinates and the font size of the character.

III. Identifying Distances Between Characters

The content processing application of some embodiments uses the sections defined by the quantized coordinates to determine a shortest distance between the right edge of a left character and the left edge of a right character. In some embodiments, the content processing application iteratively checks the distances between different sets of sections of the edges of characters to determine how far apart the edges are from each other.

One advantage of using the processes described with respect to FIGS. 6 and 7, below to determine the distance between characters is that the processes require a number of steps approximately proportional to the sum of the number of sections in the two edges (in programming big O notation, the described process is O(N+M)). This is distinguished from previous methods of determining the distance between two quantized edges that required checking every section on the first edge against every section on the second edge. Checking all possible pairs of sections requires a number of operations proportional to the product of the number of sections in the two edges (in programming big O notation, the prior art process is O(N*M)).

Figure 6:
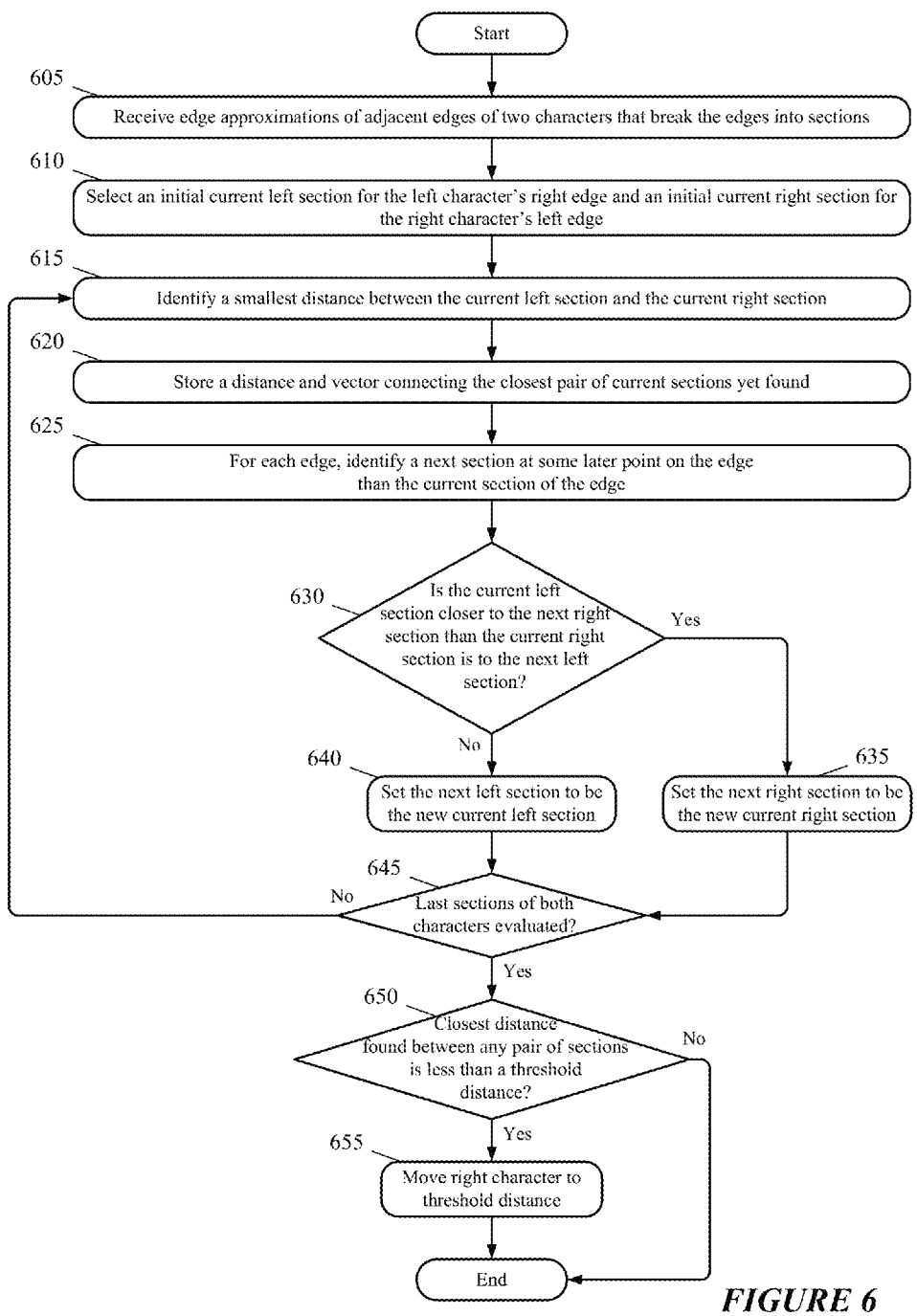
FIG. 6 conceptually illustrates a process that determines a shortest distance between two characters and moves the right character to the threshold distance.

FIG. 6 conceptually illustrates a process 600 that determines a shortest distance between two characters and moves the right character to the threshold distance. The process 600 begins by receiving (at 605) edge approximations of adjacent edges of two characters. In some embodiments, the received edge approximations are from a cache. In some embodiments the received edge approximations are calculated by a content processing application just before they are received by the process 600.

After receiving the edge approximations, the process 600 selects (at 610) an initial current left section. A "current left section" is a section of the right edge of the left character that is selected at the time to be used as a basis of comparison of distances between sections of the right character and the current left section. The current left section is a variable that changes during the process 600. The process 600 also selects (at 610) an initial current right section. A "current right section" is a section of the left edge of the right character that is selected at the time to be used as a basis of comparison of distances between sections of the left character and the current right section. The current right section is also a variable that changes during the process 600. In some embodiments the initial current left and right sections are the topmost sections of the adjacent edges of the characters. In other embodiments the initial current sections are the bottommost sections of the adjacent edges of the characters.

After selecting the two sections, the process 600 identifies (at 615) a smallest distance between the current left section and the current right section. Some embodiments identify the distance as described with respect to FIGS. 10-13 and equation (1), below. After determining the shortest distance between the two current sections, the process 600 stores (at 620) the shortest distance yet identified for any pair of current sections that the process has analyzed. In some embodiments, the process 600 iteratively compares the shortest distance of each new set of current sections against a previously recorded shortest distance between a pair of closest identified sections. When the distance between the new set of current sections is closer to each other than the old record for closest current sections, the old record is replaced with the new shortest distance. In some embodiments, the content processing application also stores a record of the vector connecting the closest set of current sections.

After storing (or not changing) the shortest distance between any set of current sections, the process identifies (at 625) a next section for each edge that is at a later point than the current section. The next section for each edge is not necessarily the section that immediately follows the current section of that edge. A description of a process of some embodiments for determining which section should be the next section for each edge is described below with respect to FIG. 7. In some embodiments, if the process has already reached the last section of an edge, then the next section for that edge will be set to the current section of that edge, rather than a (non-existent) later section of that edge. The process 600 continues after the last section of one edge is reached until the last section of the other edge is also reached.

After identifying a next section for each edge, the process 600 determines which next section results in a shorter distance from the current section of the other character. The process 600 determines (at 630) whether the distance between the current left section and the next right section is shorter than the distance between the current right section and the next left section. If the current left section is closer to the next right section, then the next right section is set (at 635) as the new current right section. If the current right section is closer to the next left section, then the next left section is set (at 640) as the new current left section. That is, whichever next section yields the shorter distance is set as the new current section. The other current section is maintained as the current section of that character for at least one more iteration of the process 600.

The process 600 continues until both the edges have reached their ends and the distance between the ends has been evaluated. Accordingly, after setting a new current section for one of the characters, the process 600 determines (at 645) whether the distance between the last sections of each edge has been evaluated. If the distance between the last sections of each edge has not been evaluated, then the process returns to operation 615 to determine the distance between the current pair of sections. If the last sections have been evaluated to determine the distance between them, then the process 600 stops iterating the operations 615-645 and determines (at 650) whether the closest distance found between any pair of sections is less than a threshold distance. If the closest distance found between a pair of sections is more than the threshold distance, then the process ends. If the closest distance found between a pair of sections is less than the threshold distance then the process 600 moves (at 655) the right character to the threshold distance. In some embodiments, the process 600 also moves all subsequent characters in the set.

Although the above described process 600 is described with respect to a certain order of operations, one of ordinary skill in the art will understand that in some embodiments those operations could be done in a different order. For example, in some embodiments, the determination as to whether a pair of sections is less than a threshold distance apart could be performed for each set of sections with only those sets that are closer than the threshold distance being tested to see if they are shorter than the shortest previously discovered distance. Similarly, in some embodiments, the determination as to whether the last sections of both character edges have been evaluated could be performed at a different time (e.g., before setting the new current left section to be the next left section or the new right section to be the new right section). Additionally, while the above described process works from left to right and moves characters to the right, one of ordinary skill will understand that in some embodiments, the process works from right to left (e.g., when evaluating Hebrew characters or in some embodiments, when evaluating left justified characters), from top to bottom, or from bottom to top and moves the characters accordingly. Similarly, if the process 600 is performed on a set of centered characters, the movement of the characters relative to each other will be to the right, but the actual movement of the characters will depend on their position as well as their relative movement.

As described above, with respect to FIG. 6, operation 625, the processes of some embodiments identify a next section at some later point on the edge than the current section. FIG. 7 conceptually illustrates a process 700 of some embodiments for determining a next section of each edge to use for comparison of distances with a next section of the other edge. FIG. 7 describes a process 700 that elaborates on operation 625. The process 700 is therefore described in the context of the process 600 of FIG. 6. The description of FIG. 7 refers to a "current right section" and a "current left section". The "current right section" is the currently selected section of the left edge of the right character as selected in operation 610 or 635 of the process 600 of FIG. 6. The "current left section" is the currently selected section of the right edge of the left character as selected in operation 610 or 640 of the process 600 of FIG. 6. FIG. 7 will be described in relation to FIG. 8. FIG. 8 conceptually illustrates the selection of various types of sections in stages 801-805. FIG. 8 in stage 801 includes current left section 810, initial next left section 811, initial left threshold section 812, current right section 815, initial next right section 816, and initial right threshold section 817. The current left section 810 and current right section 815 are set before a given iteration of the process 700 of FIG. 7.

The process 700 begins by setting (at 704) the section of the left character immediately following the current left section as the next left section and setting the section of the right character immediately following the current right section as the next right section. That is, for each character, the section immediately following the currently selected section is the initial selection for the next section of that character. However, later in process 700 the selection of the next section changes under some circumstances. The initial next left section in FIG. 8 is section 811. The initial next right section is section 816. They both immediately follow the current section of their respective edges.

In some embodiments, the process 700 then tries to identify a later section for each edge that is closer to the current section of the other edge than the next section (i.e., the section selected in operation 704) is. The first attempt to determine such a section for the left character is a "left threshold section". The first attempt to determine such a section for the right character is a "right threshold section".

After setting the initial value of the next section, the process 700 of some embodiments uses (at 708) a later left section (if any) extends farther to the right than the current left section as an initial setting of a left threshold section. The left threshold section may change in later operations of the process 700, however in some embodiments, the initial setting of the left threshold section is saved for use in later iterations of the process 700 even though the left threshold section setting changes within process 700. In such embodiments, after the end of process 700, the left threshold section is returned to its initially calculated value. The initial left threshold section in FIG. 8 is section 812, the first section below current left section 810 that extends to the right of the current left section 810.

The following reasons explain why the initial setting of the left threshold section is stored for later iterations of the process 700. The initial setting of the left threshold section is the first section that is (1) later in the set of left sections than the current section, and (2) has a horizontal coordinate (rightmost location) that is further right than the horizontal coordinate (rightmost location) of the current left section. For a given current left section, the next section to the right of it will also be to the right of every section after the current left section until at least the initial left threshold section itself. For example, the left threshold section 812 in FIG. 8 extends to the right of both current section 810 and all subsequent sections except itself.

As described above, the process 700 is an elaboration of the operation 625 of process 600 of FIG. 6. Therefore, in the course of executing process 600, a content processing application will execute process 700 of FIG. 7 many times, each time with either a different current right section or a different current left section than the previous iteration. Because the threshold left section is to the right of all sections between the current section and the threshold left section, in some embodiments, as the current left section advances (i.e., through iterations of operation 640 of process 600 of FIG. 6), the initial left threshold section does not change until the current left section advances to the initial left threshold section itself. Once the current left section reaches the initial left threshold section, a new initial left threshold section is calculated relative to the then current left section.

Therefore, in some embodiments, once an initial left threshold section is identified, that initial left threshold section is saved to be used as the initial left threshold section in later iterations of the process 700. In such embodiments, a new initial left threshold section is calculated only in iterations in which the current left section has reached or passed the previously calculated initial left threshold section.

After identifying (or maintaining) the initial left threshold section, the process 700 of some embodiments uses (at 712) a later right section (if any) that extends farther to the left than the current right section as an initial setting of a right threshold section. The right threshold section may also change in later operations of the process 700. However in some embodiments, the initial setting of the right threshold section is saved for use in later iterations of the process 700 even though the right threshold section setting changes within process 700. The initial right threshold section in FIG. 8 is section 817, the first section below current right section 815 that extends to the left of the current right section 815.

The reasons explained above for re-using an initial setting of a left threshold section apply to re-using an initial setting of the right threshold section. Therefore, in some embodiments, once an initial right threshold section is identified, that initial right threshold section is saved to use as the initial right threshold section in later iterations of the process 700 (operation 625). In such embodiments, a new initial right threshold section is calculated only in iterations in which the current right section has reached or passed the previously calculated initial right threshold section.

For some characters, once a particular section becomes the current right section there is no right threshold section because the horizontal coordinates that define each section after the particular section are farther to the right than the horizontal coordinates that define the particular section. For example, on the left edge of a "W" character in the Times New Roman font, all sections after the serif at the top of the letter are to the right of the top section (assuming that the character is being analyzed from the top down). In some embodiments, when there are no further right threshold sections after a current right section, the content processing application identifies the absence of a right threshold section. In some such embodiments, once the content processing application determines for one current right section that there is no right threshold section, the content processing application stores data indicating that there is no right threshold section and does not look for a right threshold section for any subsequent current right section during later iterations of the process 700. In other embodiments, the content processing application does look for a right threshold section for subsequent current right sections even after an iteration in which there is no right threshold section.

If the process 700 determines (at 716) that there is no right threshold section then the process 700 moves ahead to operation 748, leaving the next right section as the section directly after the current right section. If the process determines (at 716) that there is a right threshold section, then the process 700 proceeds with a set of operations 720-744 that may change the next right section setting to a later section.

In some embodiments, the process 700 tries to advance the next right section toward the right threshold section. However, in some of those embodiments, the process 700 limits the advancement to either the section across from the current left section or the section across from the left threshold section, if any. Accordingly, the process 700 determines (at 720) whether there is a left threshold section. If there is a left threshold section, then the process 700 sets (at 724) a threshold height at the vertical position of the left threshold section. The left threshold section in FIG. 8 is section 812. Accordingly, in stage 802 of FIG. 8, the threshold height 820 is set at the level of the left threshold section 812. If the process determines (at 720) that there is not a left threshold section then the process sets (at 728) a threshold height at the vertical position of the current left section.

After setting a threshold height, the process 700 determines (at 732) whether the right threshold section is after the threshold height. If the right threshold section is after the threshold height, then the process 700 sets (at 736) a new right threshold section at the threshold height and proceeds to operation 740. If the process determines (at 732) that the right threshold section is not after the threshold height, then the process proceeds to operation 740 without setting a new right threshold section. Accordingly, in stage 802 of FIG. 8, the new right threshold section 827 is set at the threshold height 820 because the right threshold section 817 was after the threshold height 820.

The processes of some embodiments determine which section would be a better next right section, the current next right section, or the current right threshold section. The closer the section is to the current left section, the better candidate it is for next right section. Therefore, the process 700 determines (at 740) whether the right threshold section is closer to the current left section than the next right section is. If the right threshold section is closer to current left section than the next right section is, then the process sets (at 744) a new next right section at the right threshold section and proceeds to operation 748. If the process determines (at 740) that the right threshold section is not closer to current left section than the next right section is, then the process leaves the current next right section as the next right section and proceeds to operation 748. In stage 803 of FIG. 8, the next right section 816 is closer to the current left section 810 than the right threshold section 827 is, accordingly, the next right section 816 remains the next right section.

As described above with respect to the right threshold section, for some characters, once a particular section becomes the current left section there is no left threshold section because the horizontal coordinates that define each section after the particular section are farther left than the horizontal coordinates that define the particular section. For example, on the right edge of a capital "B" character in the Times New Roman font, all sections after rightmost part of the lower bump of the letter are to the left of the rightmost part of the lower bump (assuming that the character is being analyzed from the top down). In some embodiments, when there are no further left threshold sections after a current left section, the content processing application identifies the absence of a left threshold section. In some such embodiments, once the content processing application determines for one current left section that there is no left threshold section, the content processing application stores data indicating that there is no left threshold section and does not look for a left threshold section for any subsequent current left section during later iterations of the process 700. In other embodiments, the content processing application does look for a left threshold section for subsequent current left sections even after an iteration in which there is no left threshold section.

If the process 700 determines (at 748) that there is no left threshold section then the process 700 skips ahead to the end of process 700, leaving the next left section as the section directly after the current left section. If the process determines (at 748) that there is a left threshold section, then the process 700 proceeds with a set of operations 752-776 that may change the next left section setting to a later section.

In some embodiments, the process 700 tries to advance the next left section toward the left threshold section. However, in some of those embodiments, the process 700 limits the advancement to either the section across from the current right section or the section across from the right threshold section, if any. Accordingly, the process 700 determines (at 752) whether there is a next right threshold section. If there is a next right threshold section, then the process 700 sets (at 756) a threshold height at the vertical position of the right threshold section. If the process determines (at 752) there is not a right threshold section then the process sets (at 760) a threshold height at the vertical position of the current right section. In stage 804 of FIG. 8, there is a right threshold section 827, so the threshold height 840 is set at the level of the right threshold section 827.

After setting a threshold height, the process 700 determines (at 764) whether the left threshold section is after the threshold height. If the left threshold section is after the threshold height, then the process 700 sets (at 768) a new left threshold section at the threshold height and proceeds to operation 772. If the process determines (at 764) that the left threshold section is not after the threshold height, then the process leaves the left threshold section unchanged and proceeds to operation 772. In stage 804 of FIG. 8, the left threshold section 812 is not after the threshold height 840 and is therefore left unchanged.

The processes of some embodiments determine which section would be a better next left section, the current next left section, or the current left threshold section. The closer the section is to the current right section, the better candidate it is for next left section. Therefore, the process 700 determines (at 772) whether the left threshold section is closer to current right section than the next left section is. If the left threshold section is closer to current right section than the next left section is then the process sets (at 776) a new next left section at the left threshold section and ends. If the process determines (at 772) that the left threshold section is not closer to current right section than the next left section is, then the process leaves the current next left section as the next left section and ends. In stage 804 of FIG. 8, the left threshold section 812 extends far enough to the right that it is closer to the current right section 815 than the next left section 811 is. Accordingly, in stage 805, the left threshold section 812 is the new next left section 850.

Figure 7:
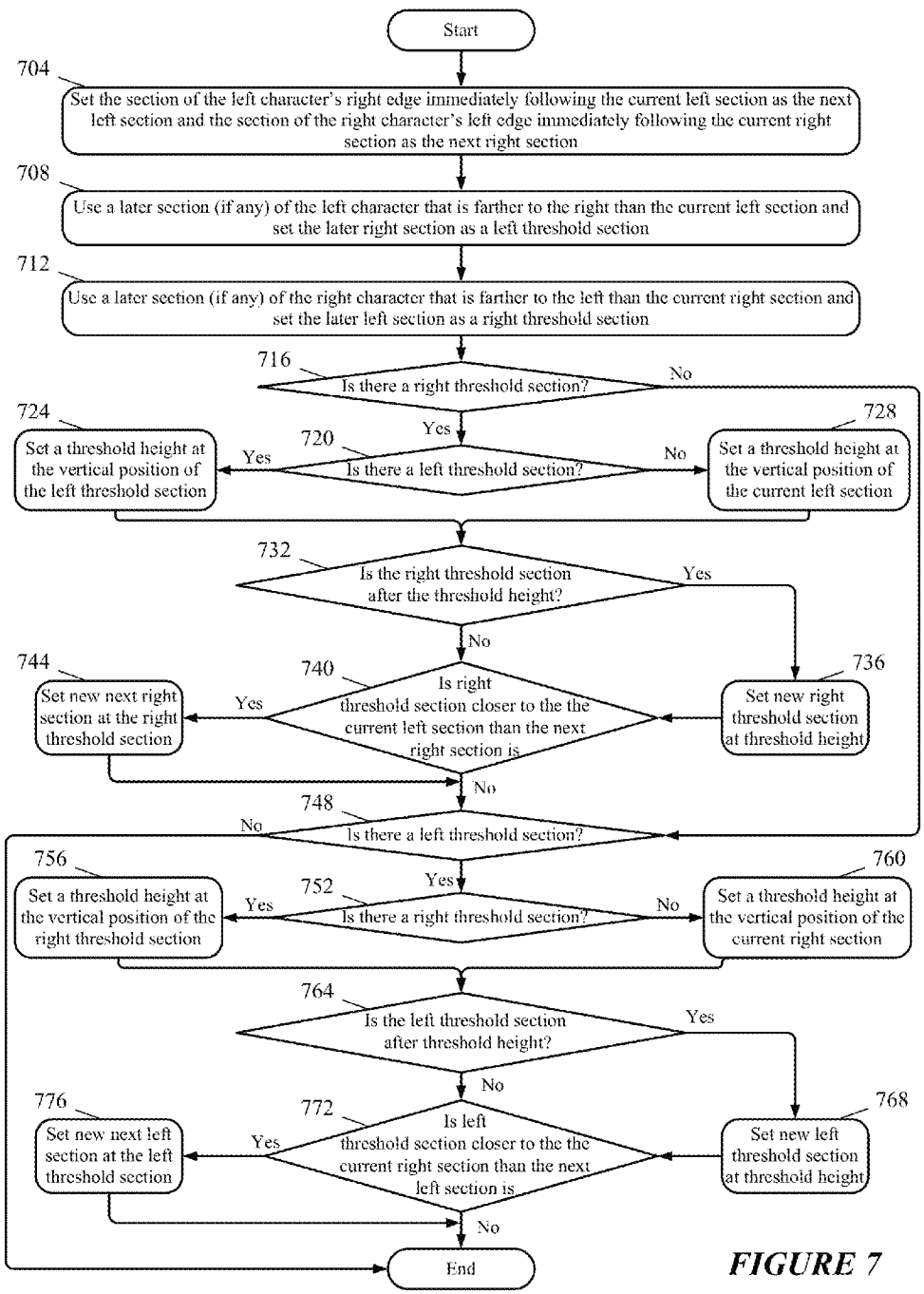
FIG. 7 conceptually illustrates a process of some embodiments for determining a next section of each edge to use for comparison of distances with a next section of the other edge.
Figure 8:
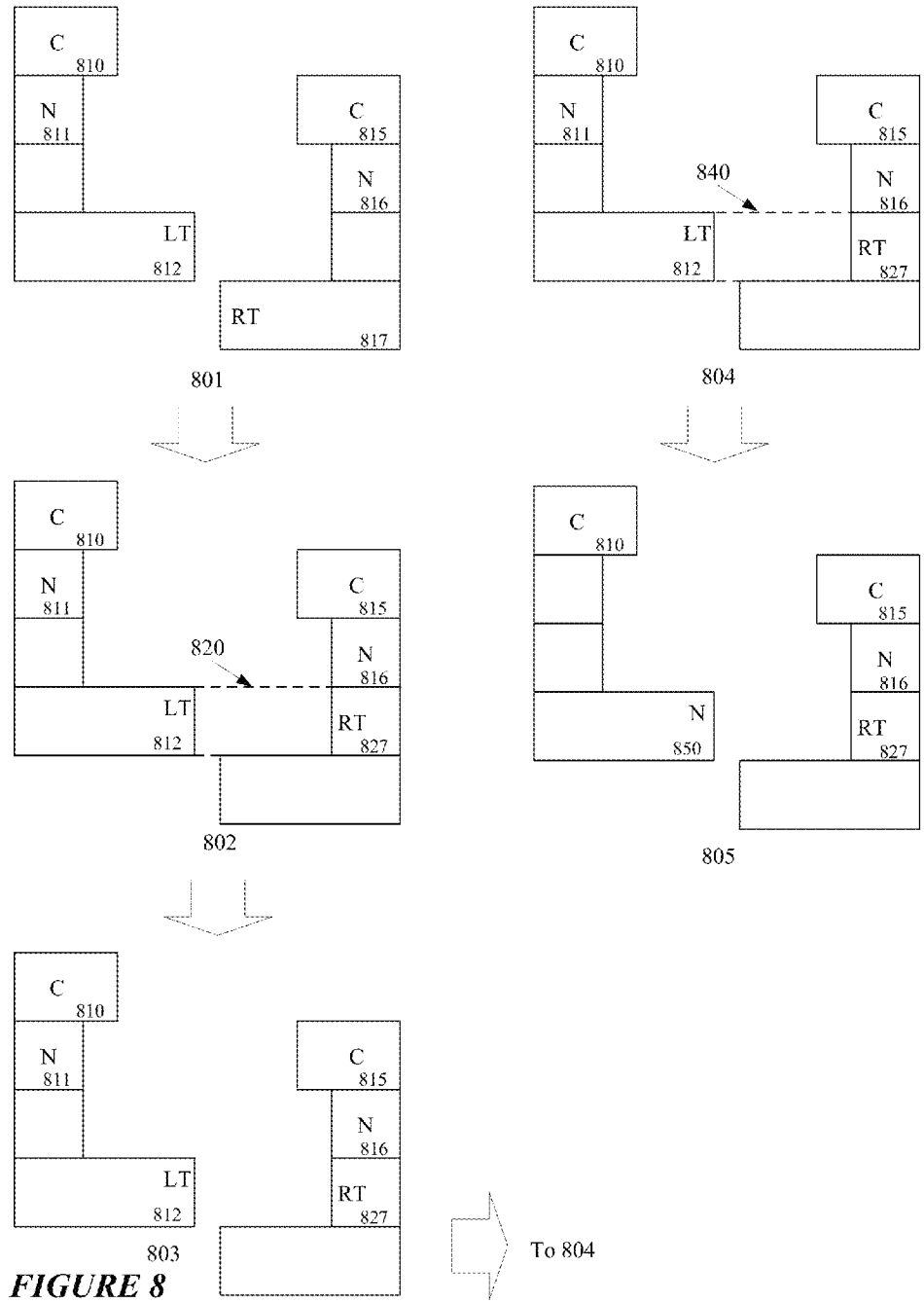
FIG. 8 conceptually illustrates the selection of various types of sections.
Figure 9:
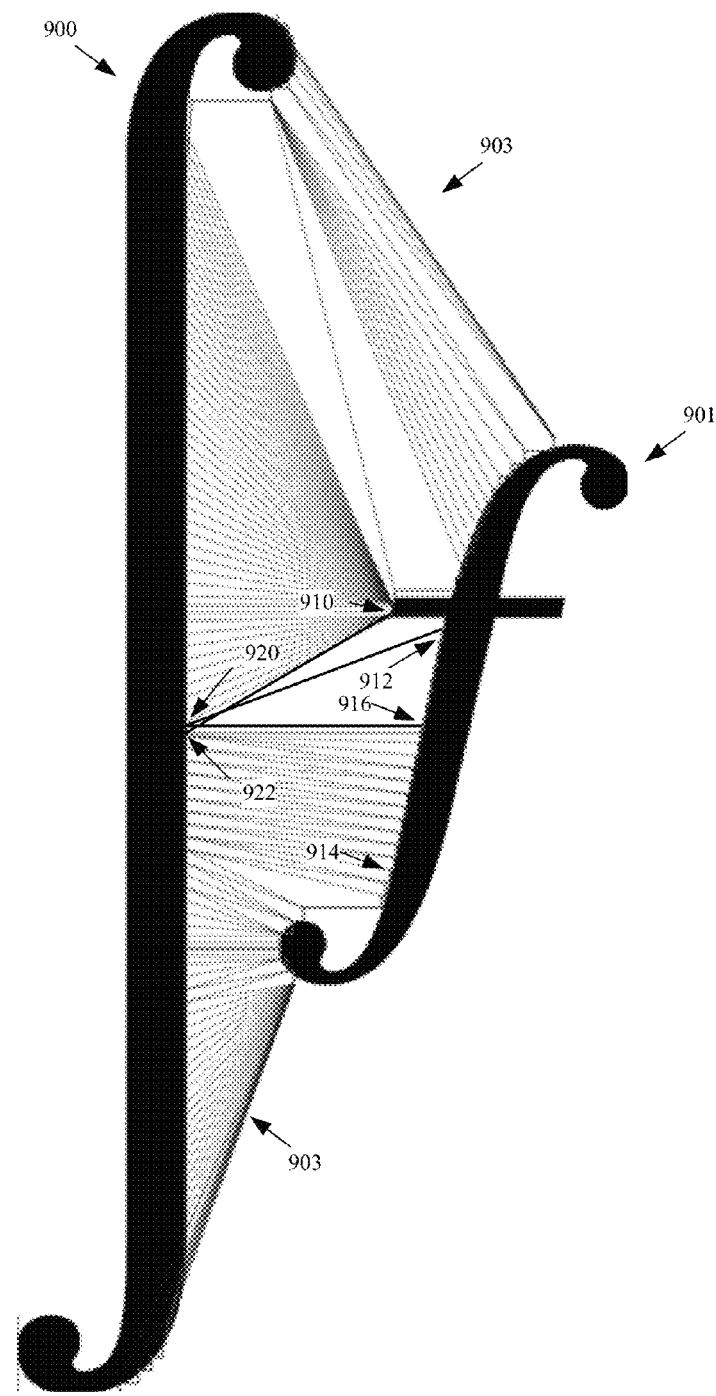
FIG. 9 illustrates the shortest lines connecting current sections of the edges of characters and the closest of the candidate sections between two edges.

Together, the processes 600 of FIGS. 6 and 700 of FIG. 7 start by determining the distance between the top (or bottom) two sections of the respective adjacent edges of adjacent characters. The processes then iteratively advance to one of a new section on the left character or a new section on the right character after determining good candidates for advancement on each edge and testing the candidates to determine which provides the shortest distance between a candidate section and the current section on the other side. One iteration of operation 625 and operation 630 will be described with respect to FIG. 9. As described above, the process 700 is an elaboration of operation 625 of process 600 of FIG. 6. Operation 630 checks whether the next section of the left character or the next section of the right character is closer to the opposite current section. FIG. 9 illustrates the shortest lines connecting current sections of the edges of characters and the closest of the candidate sections for an entire execution of process 600.

FIG. 9 includes characters 900 and 901, lines 903, sections 910, 912, 914, 916, 920 and 922, and line 930. Character 900 is an integral symbol and is the left character in a pair of adjacent characters. Character 901 is an italic "f" and is the right character in a pair of adjacent characters. Lines 903 represent the shortest lines found using operation 630 in multiple iterations of the process 600. Section 910 is an example of a current right section for a particular iteration of process 700. Section 912 is an initial next right section for the particular iteration. Section 914 is an initial right threshold section for the particular iteration. Section 916 is a new right threshold section for the particular iteration. Section 920 is a current left section for the particular iteration. Section 922 is a next left section for the particular iteration. Line 930 is the shortest line connecting a section of characters 900 and 901.

In a particular iteration of the process 700, the current sections are 910 and 920. The process 700 has identified or maintained (at 708) the section 914 as the initial right threshold section. The process 700 has also determined (at 712) that there is no left threshold section for current left section 920. Because there is no left threshold section, the process 700 sets (at 728) the threshold height as the height of the current left section 920. The threshold height is before (above) the initial right threshold section 914. Accordingly, the process 700 sets (at 736) a new right threshold section 916, across from the current left section 920.

The process 700 then determines (at 740) that the new right threshold section 916 is closer to the current left section 920 than the initial next right section 912 is. The process 700 therefore sets (at 744) the new right threshold section 916 as the new next left section. The process 600 then determines (at 630) whether the next right section 916 is closer to the current left section 920 than the next left section 922 is to the current right section 910. In the example of FIG. 9, the next right section 916 is closer to the current left section 920 than the next left section 922 is to the current right section 910. Therefore the process 600 sets (at 635) the next right section 916 as the current right section for the next iteration of operations 615-645.

When determining the distance between two sections, the geometric relationship between the sections must be considered. There are three different possible geometric relationships between two sections on the adjacent edges of two adjacent figures. First, the selected sections of the characters could overlap. Second, the right edge of the selected section of the left character could be to the right of the left edge of the selected section of the right character, (overlapping horizontally) without the sections overlapping vertically. Third, the right edge of the section on the left character could be to the left of the left edge of the section on the right character. In order to determine the distance between two sections, the content processing application of some embodiments uses different measurements for different geometric relationships.

Figure 10:
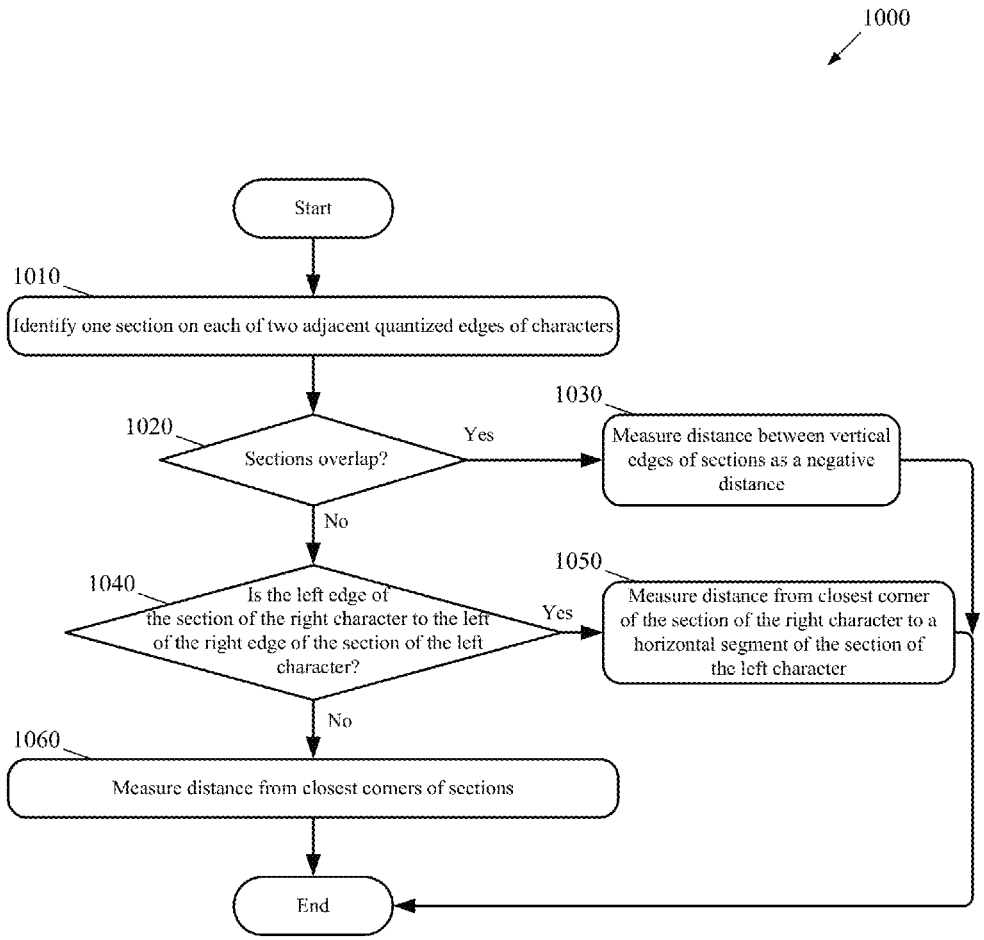
FIG. 10 conceptually illustrates a process that determines the distance between two selected sections of a pair of adjacent characters.
Figure 11:
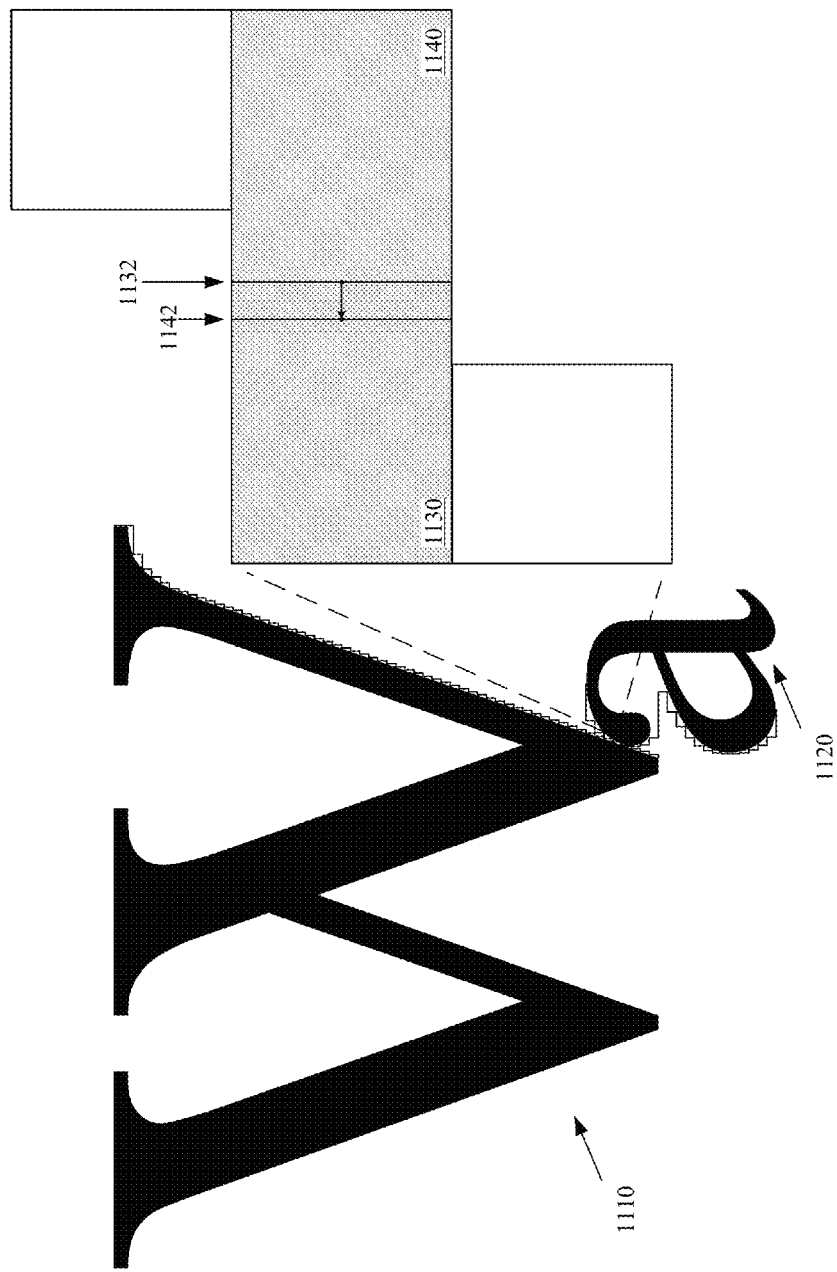
FIG. 11 illustrates an example of two characters with an overlapping pair of sections.

FIG. 10 conceptually illustrates a process 1000 that determines the distance between two selected sections of a pair of adjacent characters. Various operations of FIG. 10 are described with respect to FIGS. 11-13. The process 1000 begins by identifying (at 1010) one selected section on each of two adjacent characters. The process 1000 then determines (at 1020) whether the two identified sections overlap. FIG. 11 illustrates an example of two characters with an overlapping pair of sections. FIG. 11 includes left character 1110, right character 1120, selected section 1130 with right side 1132, and selected section 1140 with left side 1142. Left character 1110 is a capital "W". Right character 1120 is a lower case "a". The characters 1110 and 1120 are so close together that their selected sections 1130 and 1140 overlap. In this figure, the right side 1132 of selected section 1130 is to the right of the left side 1142 of selected section 1140. The selected sections are also on the same level vertically and so they overlap.

In the process 1000 of FIG. 10, if the process determines (at 1020) that the selected sections overlap, then the process 1000 measures (at 1030) the distance between the edges of the sections as a negative distance. An example of this is shown in FIG. 11 by the left pointing arrow from right side 1132 to the left side 1142.

Figure 12:
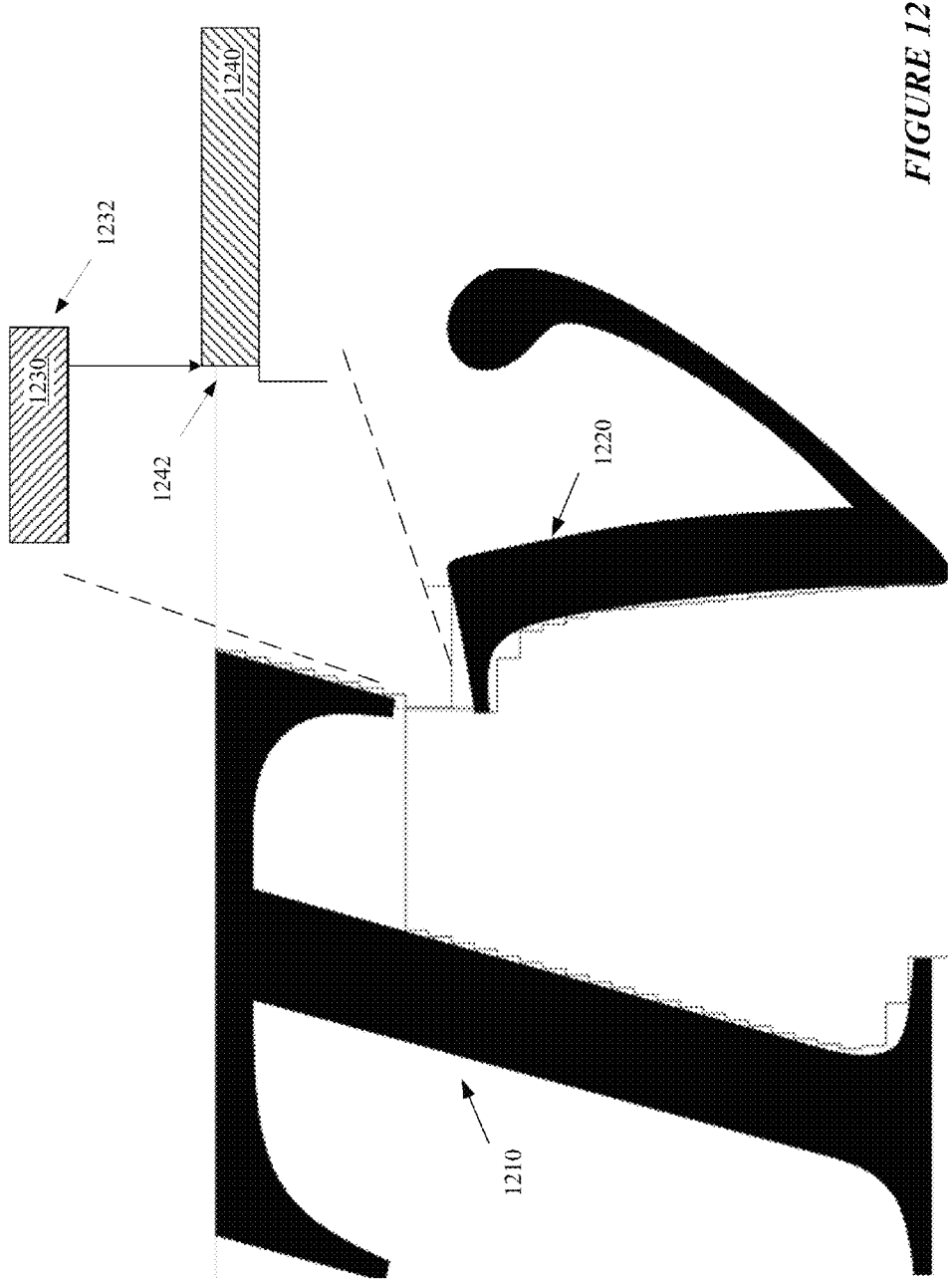
FIG. 12 illustrates an example of two characters with a non-overlapping pair of sections.

If the process 1000 determines (at 1020) that the selected sections do not overlap, then the process 1000 proceeds to operation 1040. The process 1000 then determines (at 1040) whether the left edge of the selected section of the right character is to the left of the right edge of the selected section of the left character. FIG. 12 illustrates an example of two characters with a non-overlapping pair of sections. FIG. 12 includes left character 1210, right character 1220, selected section 1230 with right side 1232, and selected section 1240 with left side 1242. Left character 1210 is an italic capital "T". Right character 1220 is a lower case italic "v". The characters 1210 and 1220 are so close together that their selected sections 1230 and 1240 overlap horizontally, but the selected sections do not overlap vertically. In this figure, the right side 1232 of selected section 1230 is to the right of the left side 1242 of selected section 1240. The selected sections are not on the same level vertically and so they do not overlap.

If the process 1000 determines (at 1040) that the left edge of the selected section of the right character is to the left of the right edge of the selected section of the left character, then the process 1000 measures (at 1050) the distance straight down (or up if the selected section of the right character is above the selected section of the left character) from the closest horizontal side of the selected section of the left character to the closest corner of the selected section of the right character. An example of this is shown in FIG. 12, by the downward arrow from the bottom of selected section 1230 to the top left corner of the selected section 1240.

Figure 13:
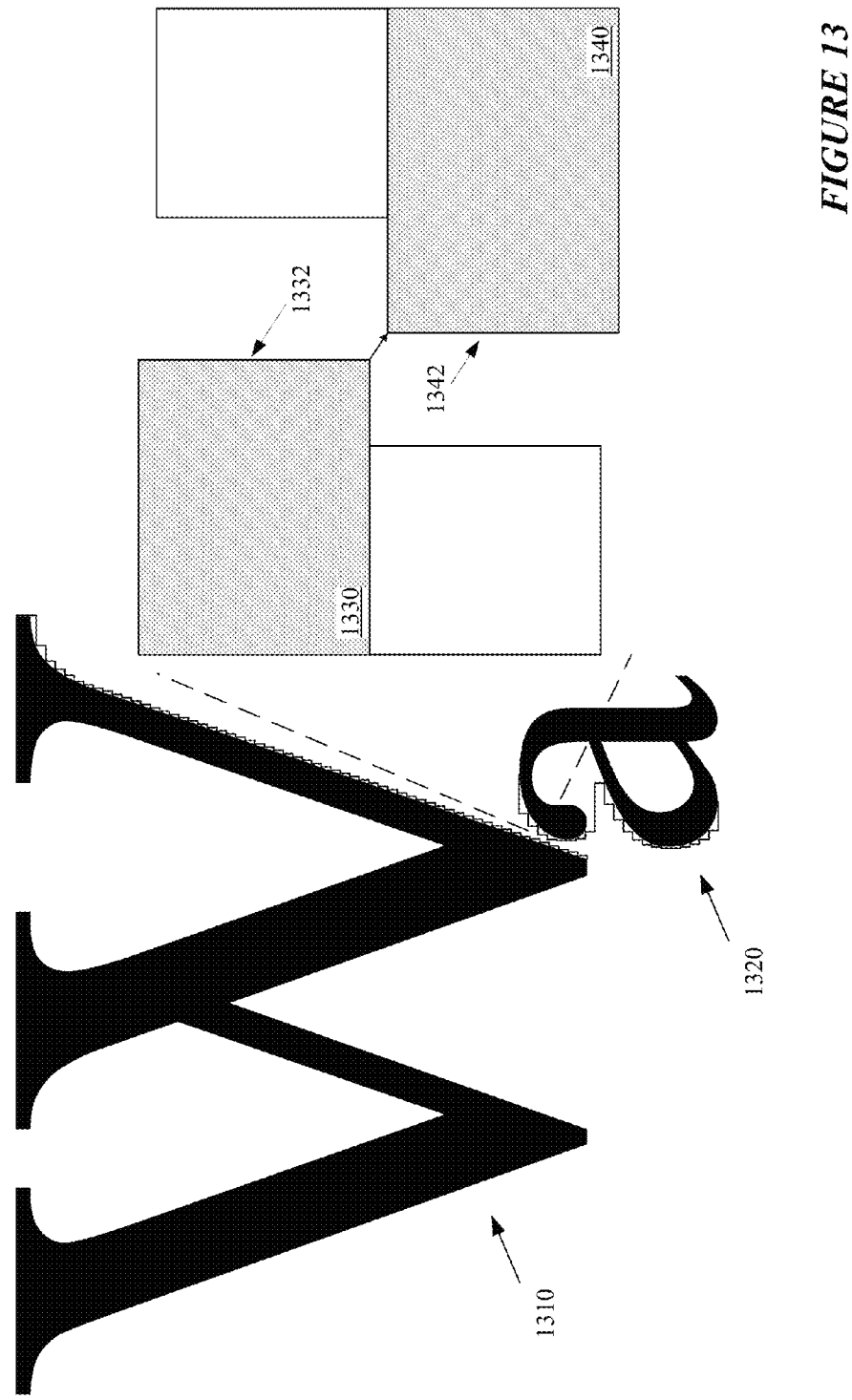
FIG. 13 illustrates another example of two characters with a non-overlapping pair of sections.

If the process 1000 determines (at 1040) that the left edge of the selected section of the right character is to the right of the right edge of the selected section of the left character, then the process 1000 measures (at 1060) the distance between the closest corners of the selected sections. FIG. 13 illustrates another example of two characters with a non-overlapping pair of sections. FIG. 13 includes left character 1310, right character 1320, selected section 1330 with right side 1332, and selected section 1340 with left side 1342. Left character 1310 is a capital "W". Right character 1320 is a lower case "a". The characters 1310 and 1320 are close together, but the selected sections 1330 and 1340 do not overlap horizontally or vertically. In this figure, the right side 1332 of selected section 1330 is to the left of the left side 1342 of selected section 1340. Accordingly, the distance between the selected sections 1330 and 1340 is determined by the closest corners of the sections 1330 and 1340. As shown by the arrow from the lower right corner of selected section 1330 to the upper left corner of selected section 1340.

Once the smallest distance between sections is determined, the content processing applications of some embodiments calculate an offset to add to the right character to place it the threshold distance away from the left character. Some embodiments use the equation (1) to determine the distance to move the right character.

$$\text{Offset} = (\text{Thresh}^2 - \text{ShortestVecHeight}^2)^{0.5} + \text{LeftOffset} - \text{RightOffset} \quad (1)$$

In equation (1), "Thresh" is the threshold distance, "ShortestVecHeight" is the size of the vertical component of the vector connecting the two closest sections of the adjacent edges of the characters, "LeftOffset" is the rightmost coordinate of the section of the left character closest to the right character, "RightOffset" is the leftmost coordinate of the section of the right character closest to the left character. As previously described, for some embodiments, when determining the distance between overlapping sections, the distance is negative. When the distance between the characters is negative, the "LeftOffset−RightOffset" term is positive and therefore increases the "Offset" term to more than the threshold distance.

In some embodiments, before calculating the "Offset" to move the character, the content processing application recalculates the vector between the sections to be the vector between the closest corners of the sections rather than the vector between the corner of one section and the closest horizontal side of the other section. In other embodiments, the content processing application does not recalculate the vector, but instead uses the already calculated vector between the corner of one section and the closest horizontal side of the other section. While the above described embodiments moved characters apart, in some embodiments, characters that are more than a threshold distance apart are moved closer together. In some such embodiments different thresholds are used for moving characters apart than for moving them closer together.

IV. Document Authoring Application

Figure 14:
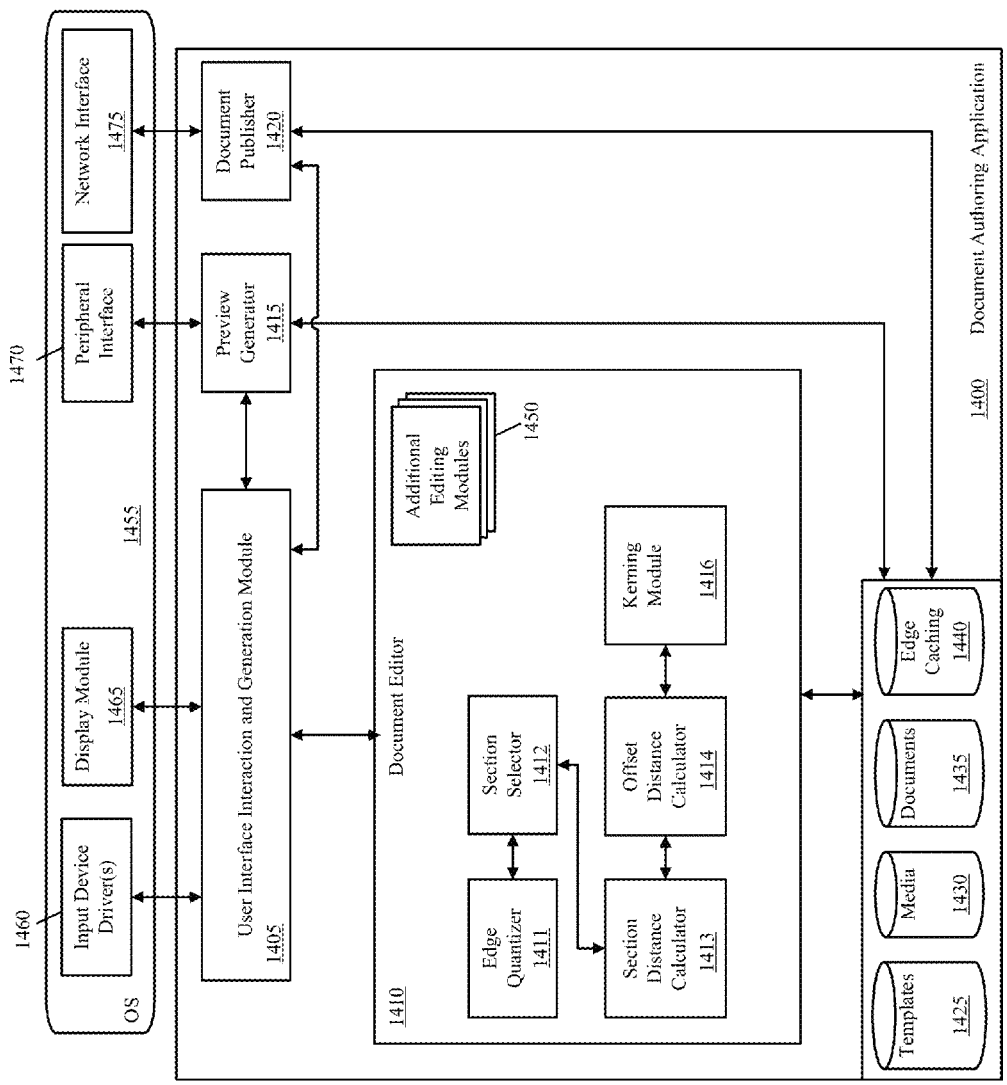
FIG. 14 conceptually illustrates the software architecture of a document authoring application of some embodiments.

In some embodiments, the processes described above are implemented as software running on a particular machine, such as a computer or a handheld device, or stored in a machine-readable medium. FIG. 14 conceptually illustrates the software architecture of a document authoring application 1400 of some embodiments. In some embodiments, the document authoring application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The document authoring application 1400 includes a user interface (UI) interaction and generation module 1405, a document editor 1410, a preview generator 1415, and a document publisher 1420. The figure also illustrates stored data associated with the document authoring application, including templates 1425, media 1430, documents 1435, and edge caching data 1440.

In some embodiments, the templates data 1425 stores template files that define different types of documents a user can create with the document authoring application 1400. The media data 1430 stores various types of media files (e.g., still image files, video files, audio files, combined video and audio files, etc.) imported into the application. The documents data 1435 of some embodiments stores user-created documents that may incorporate or refer to media 1430 and templates 1425. In some embodiments, the documents 1435 are stored by the document authoring application as hierarchical structures (e.g., organized into chapters, sections, etc.). In some embodiments, the edge caching data 1440 is stored as separate sets of left edges and right edges, each defined by sets of horizontal coordinates (or vertical coordinates for vertical kerning). In some embodiments, the edge caching data 1440 includes data on how far apart to place previously kerned pairs of edges.

In some embodiments, the four sets of data 1425-1440 are stored in one physical storage (e.g., an internal hard drive, external hard drive, etc.). In some embodiments, the data may be split between multiple physical storages. For instance, the template files 1425 and media files 1430 might be stored in one physical storage, while the user-created documents are stored in a separate physical storage. In addition, some or all of the data 1425-1440 may be stored across multiple physical storages in some embodiments.

FIG. 14 also illustrates an operating system 1455 that includes input device driver(s) 1460, display module 1465, peripheral interface 1470, and network interface 1475. In some embodiments, as illustrated, the device drivers 1460, display module 1465, peripheral interface 1470, and network interface 1475 are part of the operating system even when the document authoring application 1400 is an application separate from the operating system.

The input device drivers 1460 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction and generation module 1405.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 1465 translates the output of a user interface for a display device. That is, the display module 1465 receives signals (e.g., from the UI interaction and generation module 1405) describing what should be displayed and translates these signals into pixel information that is sent to the display device. The display device may be an LCD, plasma screen, CRT monitor, touchscreen, etc.

The peripheral 1470, in some embodiments, allows for a peripheral device to connect (either via a wired (e.g., USB, Firewire) connection or a wireless (e.g., Bluetooth, WiFi) connection) to the machine on which the operating system 1455 and document authoring application 1400 run. Examples of such peripheral devices may include smart phones (e.g., an iPhone), specialized electronic book readers, or more generic tablets (e.g., an iPad) that include electronic book reader functionality.

The network interface 1475 represents one or more connections to various types of networks, through which the document authoring application 1400 may upload published documents (e.g., to a content distribution system). These network connections may include WiFi or other wireless connections, Ethernet or other wired connections, etc.

The UI interaction and generation module 1405 of the document authoring application 1400 interprets the user input data received from the input device drivers and passes it to various modules, including the document editor 1410 and its various component modules, the preview generator 1415, and the document publisher 1420. The UI interaction module also manages the display of the document authoring application GUI, and outputs this display information to the display module 1465. This UI display information may be based on information from the document editor 1410, the document publisher 1420, etc. In addition, the module 1405 may generate portions of the UI based solely on user input—e.g., when a user moves an item in the UI that only affects the display rather than any of the other modules, such as moving a window from one side of the UI to the other. In some embodiments, the UI interaction and generation module 1405 generates a basic GUI and populates the GUI with information from the other modules and stored data (e.g., the document data 1435).

The document editor 1410 includes edge quantizer 1411, section selector 1412, section distance calculator 1413, offset distance calculator 1414, kerning module 1416, as well as additional editing modules 1450. The document editor 1410 enables a user to create documents (e.g., word processing documents, electronic books, etc.) with a variety of text, equations, media (e.g., audio, video), electronic book constructs (e.g., graphs, sidebars, popovers, etc.), and other features. The edge quantizer 1411 sets quantized levels of a character's left or right edge, determines the horizontal coordinates for each level, then passes the coordinates to the section selector 1412. The section selector 1412 selects a section from each edge of two adjacent edges to be compared and interacts with the section distance calculator 1413 to determine which sections should be compared next. The section distance calculator 1413, as well as interfacing with the section selector 1412 to determine which pairs of sections should be compared also provides the distances of pairs of sections to the offset distance calculator 1414. The offset distance calculator 1414 keeps track of the vectors between the closest sections yet found between two particular edges, determines how far to move the right character of the pair of characters so that the characters will be at the threshold distance apart, and passes the distance to the kerning module 1416. The kerning module 1416 increases the distance between characters by the offset determines by the offset distance calculator 1414. In some embodiments, the kerning module 1416 also moves the other characters to the right in a set of characters. In other embodiments, other modules move the other characters to the right automatically in response to the movement of the kerned character.

The additional editing modules 1450 enable various additional editing features. These features include formatting of electronic documents, addition of media and other constructs (e.g., graphs, sidebars, popovers, etc.) to electronic documents, spellchecking and other review features, etc.

The preview generator 1415 of some embodiments generates a preview of an electronic document (e.g., an electronic book) in order to allow a user to see how a document currently being edited will look in its final form. In some embodiments, the preview generator 1415 generates the preview of the document and sends this preview through the peripheral interface 1470 to an external electronic document reader device (e.g., a smart phone, a table computer, a specialized e-book reader, etc.). In addition, in some embodiments the document authoring application 1400 allows the user to preview the document through the application's user interface. The preview generator of some such embodiments can send the preview to the UI interaction and generation module 1405 for display in the authoring application user interface.

The document publisher 1420 of some embodiments generates a final version of an electronic document (e.g., an e-book in either a standardized or proprietary format) for sending out (e.g., via the network interface 1475) to a content distribution system. In some embodiments, the document publisher 1420 creates the electronic document and/or a sample version of the electronic document, and a separate application connects to the content distribution system in order to upload (publish) the document.

While many of the features of document authoring application 1400 have been described as being performed by one module (e.g., the UI interaction and generation module 1405, the document publisher 1420, etc.), one of ordinary skill in the art will recognize that the functions described herein might be split up into multiple modules. Similarly, functions described as being performed by multiple different modules might be performed by a single module in some embodiments (e.g., the preview generator 1415 might actually be part of the document publisher 1420).

V. Computer System

Figure 15:
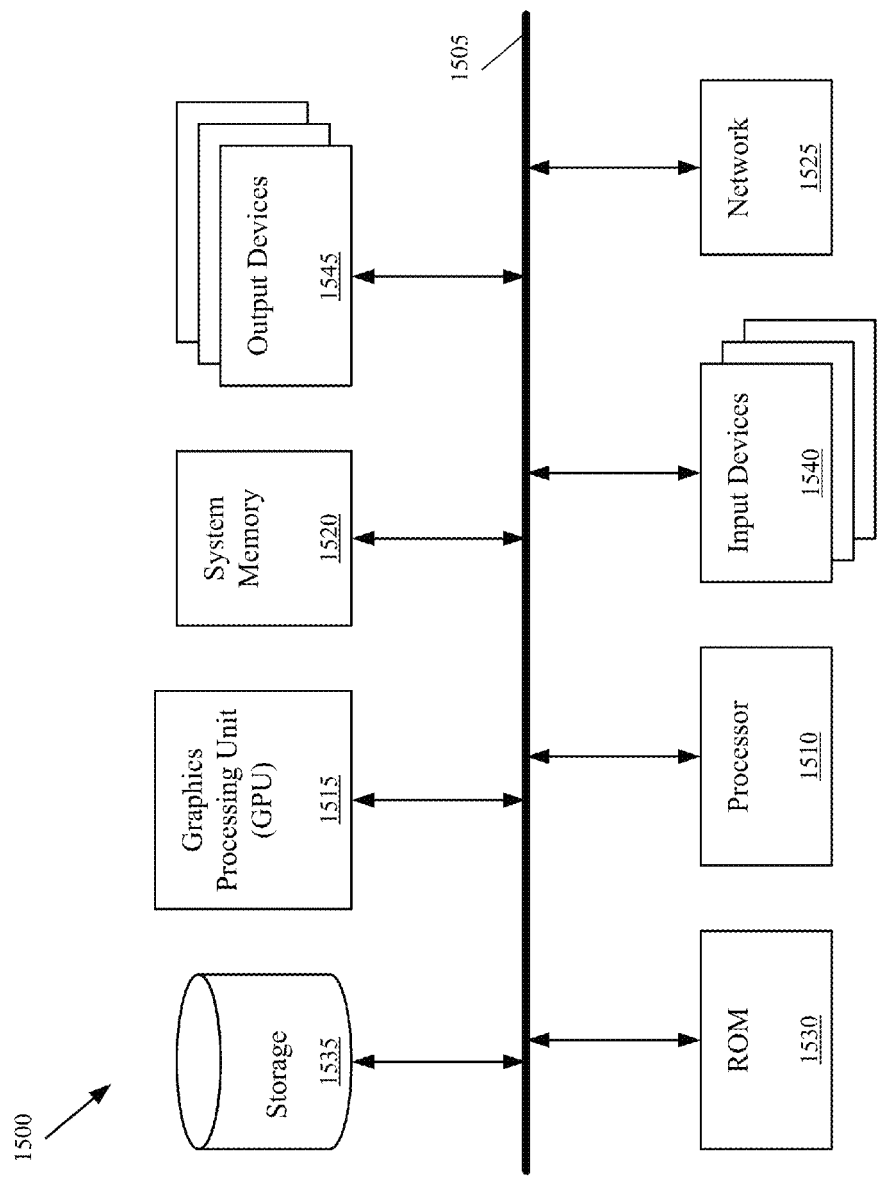
FIG. 15 conceptually illustrates an example of an electronic system with which some embodiments of the invention are implemented.

FIG. 15 conceptually illustrates an example of an electronic system 1500 with which some embodiments of the invention are implemented. The electronic system 1500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1500 includes a bus 1505, processing unit(s) 1510, a graphics processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the GPU 1515, the system memory 1520, and the permanent storage device 1535.

From these various memory units, the processing unit(s) 1510 retrieves instructions to execute and data to process in order to execute the processes of the invention. The processing unit(s) may be a single processor or a multi-core processor in different embodiments. Some instructions are passed to and executed by the GPU 1515. The GPU 1515 can offload various computations or complement the image processing provided by the processing unit(s) 1510. In some embodiments, such functionality can be provided using CoreImage's kernel shading language.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, the invention's processes are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 2, 4, 6, 7 and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A non-transitory machine readable medium storing a program which when executed by at least one processing unit displays characters, the program comprising sets of instructions for:
    approximating a right edge of graphical elements of a first character definition as a first sequential set of sections, wherein each section in the first set spans a first vertical distance and uses a rightmost point of the first character definition within its vertical span as a horizontal location for the section;
    approximating a left edge of graphical elements of a second character definition as a second sequential set of sections, wherein each section in the second set spans a second vertical distance and uses a leftmost point of the second character definition within its vertical span as a horizontal location for the section;
    iteratively:
        selecting a pair of sections, comprising a section from the first set of sections and a section from the second set of sections, wherein, in each iteration, either (i) a section that is farther along the first sequential set of sections in the first set than the section from the first set selected in the previous iteration is selected or (ii) a section that is farther along the second sequential set of sections in the second set than the section from the second set selected in the previous iteration is selected; and
        computing a distance between the selected pair of sections based on a default spacing between the character definitions;
    identifying a smallest computed distance between said selected pairs of sections; and
    displaying instances of the first character definition and the second character definition with a distance between the character instances based on the identified smallest distance.

2. The non-transitory machine readable medium of claim 1, wherein the first and second character definitions are for characters in two different fonts.

3. The non-transitory machine readable medium of claim 1, wherein the first and second character definitions are for characters in two different styles.

4. The non-transitory machine readable medium of claim 3, wherein one of the two different styles is one of a subscript style and a superscript style.

5. The non-transitory machine readable medium of claim 3, wherein one of the two different styles is one of an italic style and a bold style.

6. The non-transitory machine readable medium of claim 1, wherein the first and second character definitions are for characters in two different font sizes.

7. The non-transitory machine readable medium of claim 1, wherein for a plurality of consecutive iterations, the selected section is a section in the first set that is one section farther along the first sequential set of sections in the first set than the selected section in the first set in the previous iteration.

8. The non-transitory machine readable medium of claim 1, wherein for a plurality of iterations, the selected sections alternate between the first set and the second set.

9. The non-transitory machine readable medium of claim 8, wherein for a particular iteration, the selected section in the first set is more than one section farther along the first sequential set of sections than the selected section of the first set in the previous iteration.

10. A non-transitory machine readable medium storing a program which when executed by at least one processing unit determines distances between displayed characters, the program comprising sets of instructions for:
    determining a quantization length for each of a plurality of character definitions that each comprise one or more graphical elements that define a shape of the character;
    for each character definition:
        approximating the edges of the graphical elements of the character definition as a plurality of vertical and horizontal lines, wherein the vertical lines each span the quantization length for the character definition, wherein (i) each vertical line approximating a right edge of the character is located at a rightmost point of the graphical element within the span of the vertical line and (ii) each vertical line approximating a left edge of the character is located at a leftmost point of the graphical element within the span of the vertical line; and
        storing data identifying the plurality of lines; and
    upon receiving a command to display two characters, that comprise instances of character definitions, adjacent to each other, using the stored data for the character definitions to determine a distance between the two adjacent displayed characters based on distances between the approximated edges of the graphical elements of the two adjacent displayed characters.

11. The non-transitory machine readable medium of claim 10, wherein the set of instructions for using the stored data to determine an approximate distance between the two adjacent displayed characters comprises a set of instructions to scale the stored data for at least one displayed character from a font size for which the quantization length of the character was determined to a different font size of the displayed character.

12. The non-transitory machine readable medium of claim 10, wherein the plurality of characters are in different styles.

13. The non-transitory machine readable medium of claim 10, wherein the two adjacent displayed characters are in different fonts.

14. A method of determining a distance to implement between two adjacent displayed characters, the method comprising:
   approximating a right edge of graphical elements of a first character definition as a first sequential set of sections, wherein each section in the first set spans a first vertical distance and uses a rightmost point of the first character definition within its vertical span as a horizontal location for the section;
   approximating a left edge of graphical elements of a second character definition as a second sequential set of sections, wherein each section in the second set spans a second vertical distance and uses a leftmost point of the second character definition within its vertical span as a horizontal location for the section, wherein the approximating the right edge and the left edge are performed by an electronic device;
   iteratively:
      selecting a pair of sections, comprising a section from the first set of sections and a section from the second set of sections, wherein, in each iteration, either (i) a section that is farther along the first sequential set of sections in the first set than the section from the first set selected in the previous iteration is selected or (ii) a section that is farther along the second sequential set of sections in the second set than the section from the second set selected in the previous iteration is selected; and
      computing a distance between the selected pair of sections based on a default spacing between the character definitions;
   identifying a smallest computed distance between said selected pairs of sections; and
   displaying instances of the first character definition and the second character definition with a distance between the character instances based on the identified smallest distance,
   wherein the approximations, iterative selection and computation, identification, and display are performed by an electronic device.

15. The method of claim 14 wherein, for a plurality of iterations, the selected sections between the first set and the second set.

16. The method of claim 14, wherein for a plurality of consecutive iterations, the selected section is a section in the first set that is one section farther along the first sequential set of sections in the first set than the selected section in the first set in the previous iteration.

17. The method of claim 14, wherein for a particular iteration, the selected section in the first set is more than one section farther along the first sequential set of sections than the selected section of the first set in the previous iteration.

18. The method of claim 17, wherein in the particular iteration, the selected section in the first set is aligned with the selected section in the second set.

19. The non-transitory machine readable medium of claim 9, wherein in the particular iteration, the selected section in the first set is aligned with the selected section in the second set.

20. The non-transitory machine readable medium of claim 10, wherein the quantization length for a particular character definition comprises a particular fraction of a total available height for the character definition.

* * * * *